(12) United States Patent
Dettinger et al.

(10) Patent No.: US 7,836,078 B2
(45) Date of Patent: Nov. 16, 2010

(54) TECHNIQUES FOR MANAGING ACCESS TO PHYSICAL DATA VIA A DATA ABSTRACTION MODEL

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1735 days.

(21) Appl. No.: 11/012,906

(22) Filed: Dec. 15, 2004

(65) Prior Publication Data

US 2006/0137019 A1 Jun. 22, 2006

(51) Int. Cl.
*G06F 17/30* (2006.01)
*G06F 7/00* (2006.01)

(52) U.S. Cl. .................. 707/783; 707/713; 713/164; 726/27

(58) Field of Classification Search .................. None
See application file for complete search history.

(56) References Cited

U.S. PATENT DOCUMENTS 6,725,227 B1 * 4/2004 Li ........................ 1/1

2005/0039033 A1 * 2/2005 Meyers et al. ............. 713/193

OTHER PUBLICATIONS

U.S. Appl. No. 10/083,075, "Application Portability and Extensibility Through Database Schema and Query Abstraction", filed Feb. 26, 2002.

* cited by examiner

*Primary Examiner*—Greta L Robinson
*Assistant Examiner*—James J Wilcox
(74) *Attorney, Agent, or Firm*—Patterson & Sheridan, LLP

(57) ABSTRACT

A method, system and article of manufacture for managing access to a data abstraction model abstractly describing physical data and, more particularly, for creating a logical security model for a data abstraction model abstractly describing data in a database. One embodiment provides a computer-implemented method for creating a logical security model based on a physical security model defining user access rights to physical data. The method comprises, for each of the user access rights defined by the physical security model, creating a logical access right definition for a logical model. The logical model comprises a plurality of logical field definitions each comprising a field name and access information for accessing a field of the physical data. The logical access right definitions are applied to the logical model so that the logical model reflects the user access rights to the physical data.

26 Claims, 13 Drawing Sheets

TECHNIQUES FOR MANAGING ACCESS TO PHYSICAL DATA VIA A DATA ABSTRACTION MODEL

CROSS-RELATED APPLICATION

This application is related to the following commonly owned application: U.S. patent application Ser. No. 10/083,075, now U.S. Pat. No. 6,996,558, filed Feb. 26, 2002, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to managing access to a data abstraction model abstractly describing physical data and, more particularly, to creating a security model for a data abstraction model abstractly describing data in a database.

2. Description of the Related Art

Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a database management system (DBMS) can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Unfortunately, generating queries using SQL (and other query languages) may require a detailed understanding of the possibly complex physical layout of the underlying database and interpretation of cryptic field names. For some applications, to facilitate the query building process, an abstraction model may be utilized that, in effect, hides some of the complexities of the physical layout of the underlying database from users. The abstraction model may include logical fields with recognizable names that map to corresponding physical fields of the underlying database. "Abstract" queries may be generated containing conditions based on the logical fields. Upon issuance, the logical fields of an abstract query may be mapped to corresponding physical fields to create a physical or "concrete" query. The concepts of data abstraction and abstract queries are described in detail in the commonly owned, co-pending application Ser. No. 10/083,075, entitled "APPLICATION PORTABILITY AND EXTENSIBILITY THROUGH DATABASE SCHEMA AND QUERY ABSTRACTION", filed Feb. 26, 2002, herein incorporated by reference in its entirety.

As described in the related application Ser. No. 10/083,075 (hereinafter referred to as the '075 application), logical fields are typically mapped to a particular physical field in a physical database. For instance, if the physical database was implemented as a relational database, a particular logical field would be mapped to a particular column within a relational table. Thus, using a data abstraction model according to the framework of the '075 application, abstract queries can be constructed based on the framework without regard for the makeup of the underlying physical data.

One type of functionality that a framework such as the one of the '075 application may need to support is access management. More specifically, by accessing a data abstraction model according to the framework of the '075 application, a user may circumvent access rights implemented at the physical layer. For instance, the data abstraction model can be configured to present data of a given column of a table in an underlying physical database to the user even though the user is not allowed to access the given column at the physical layer. Accordingly, it may be desirable to implement a logical security model that reflects the access rights implemented at the physical layer in order to guarantee data security with respect to data of the underlying physical database. However, creation of any security artifact, including for a logical security model over a data abstraction model, is complex and time consuming. This is because each artifact must be rigorously and carefully constructed since even small errors in a resulting security model can leave the underlying physical database vulnerable to data corruption or unwanted disclosure of data.

Therefore, there is a need for an efficient technique for creating a logical security model for a data abstraction model abstractly describing data in a database.

SUMMARY OF THE INVENTION

The present invention is generally directed to a method, system and article of manufacture for managing access to a data abstraction model abstractly describing physical data and, more particularly, for creating a logical security model for a data abstraction model abstractly describing data in a database.

One embodiment provides a computer-implemented method for creating a logical security model based on a physical security model defining user access rights to physical data. The method comprises, for each of the user access rights defined by the physical security model, creating a logical access right definition for a logical model. The logical model comprises a plurality of logical field definitions each comprising a field name and access information for accessing a field of the physical data. The logical access right definitions are applied to the logical model so that the logical model reflects the user access rights to the physical data.

Another embodiment provides a method for creating a logical security model based on a physical security model. The method comprises automatically traversing physical data to identify physical access rights rules, and creating a plurality of views defining logical access rights rules for the identified physical access rights rules of the physical data. The plurality of views is selectively applied to a logical model comprising a plurality of logical field definitions mapping to corresponding physical fields of the physical data. The application of the plurality of views to the logical model operates to make selected logical fields unavailable to a user of the logical model, the selected logical fields being those for which logical access rights rules exist. Thereby, access to the physical data is restricted on the basis of the applied plurality of views.

Still another embodiment provides a computer-implemented method for creating a logical security model based on a physical security model defining user access rights to physical data. The method comprises, for each of the user access rights defined by the physical security model, creating a logical access right definition for a logical model. The logical model abstractly describes the physical data and is defined for accessing the physical data. The method further comprises applying the logical access right definitions to the logical model so that the logical model reflects the user access rights to the physical data.

Still another embodiment provides a computer-readable medium containing a program which, when executed by a processor, performs operations for creating a logical security model based on a physical security model defining user access rights to physical data. The operations comprise, for each of the user access rights defined by the physical security model, creating a logical access right definition for a logical model. The logical model comprises a plurality of logical field definitions each comprising a field name and access information for accessing a field of the physical data. The logical access right definitions are applied to the logical model so that the logical model reflects the user access rights to the physical data.

Still another embodiment provides a computer-readable medium containing a program which, when executed by a processor, performs operations for creating a logical security model based on a physical security model. The operations comprise traversing physical data to identify physical access rights rules, and creating a plurality of views defining logical access rights rules for the identified physical access rights rules of the physical data. The plurality of views is selectively applied to a logical model comprising a plurality of logical field definitions mapping to corresponding physical fields of the physical data. The application of the plurality of views to the logical model operates to make selected logical fields unavailable to a user of the logical model, the selected logical fields being those for which logical access rights rules exist. Thereby, access to the physical data is restricted on the basis of the applied plurality of views.

Still another embodiment provides a system comprising a physical security model defining user access rights to physical data, and a logical model security manager for creating a logical security model based on the physical security model. The logical model security manager is configured to create a logical access right definition for a logical model for each of the user access rights defined by the physical security model. The logical model comprises a plurality of logical field definitions each comprising a field name and access information for accessing a field of the physical data. The logical access right definitions are applied to the logical model so that the logical model reflects the user access rights to the physical data.

Yet another embodiment provides a system comprising a physical security model defining physical access rights rules, and a logical model security manager for creating a logical security model based on the physical security model. The logical model security manager is configured to traverse physical data to identify the physical access rights rules, and create a plurality of views defining logical access rights rules for the identified physical access rights rules of the physical data. The plurality of views is selectively applied to a logical model comprising a plurality of logical field definitions mapping to corresponding physical fields of the physical data. The application of the plurality of views to the logical model operates to make selected logical fields unavailable to a user of the logical model, the selected logical fields being those for which logical access rights rules exist. Thereby, access to the physical data is restricted on the basis of the applied plurality of views.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
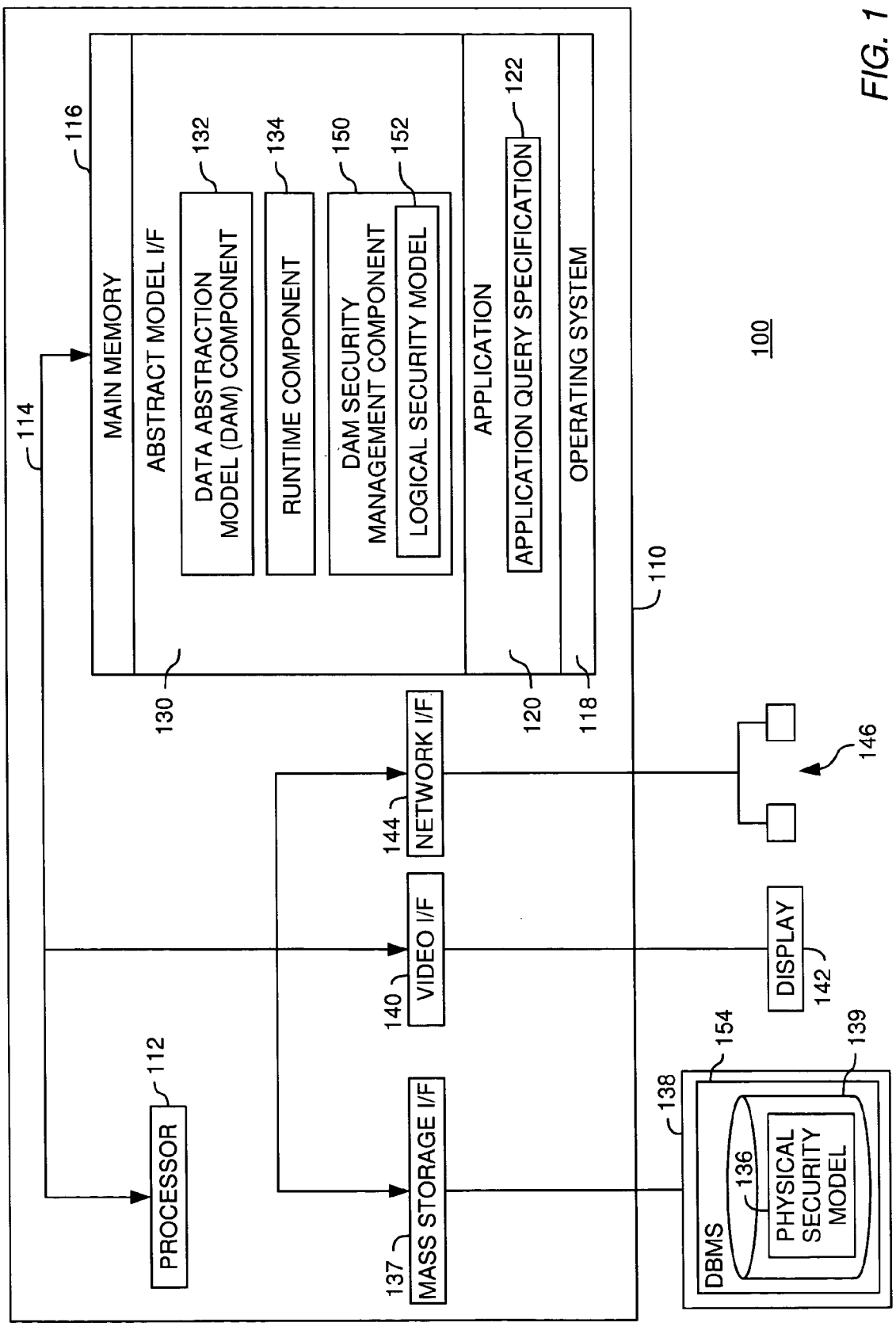
FIG. 1 is a computer system illustratively utilized in accordance with the invention.

The present invention generally is directed to a system, method and article of manufacture for managing access to a data abstraction model and, more particularly, for creating a logical security model for a data abstraction model. A data abstraction model defines a logical representation of physical data by abstractly describing the physical data. Using a data abstraction model, abstract queries against the physical data can be constructed without regard for the makeup of the physical data. The data abstraction model is adapted for facilitating transformation of the abstract queries into a form consistent with a physical representation of the physical data.

In one embodiment, a data abstraction model which abstractly describes physical data is associated with a logical security model. The logical security model is configured to restrict access to the physical data via the data abstraction model to authorized users only. According to one aspect, the logical security model is created based on a physical security model which is associated with the physical data and defines user access rights to the physical data. For each of the user access rights defined by the physical security model, a logical access right definition is created. Each logical access right definition defines a logical access rights rule that is configured to manage access to at least a portion of the data abstraction model. The logical access rights rules define the logical security model which is applied to the data abstraction model and reflects the user access rights to the physical data.

In one embodiment, the data abstraction model includes a plurality of logical field definitions. Each logical field definition may include a field name and access information for mapping the logical field to one or more physical entities of the physical data. Accordingly, a given logical field defines an abstract representation of a specific set of the physical data and the access information can be used to access a field of the physical data which contains the specific set of the physical data. According to one aspect, access to the given logical field can be restricted based on a suitable logical access rights rule.

It should be noted that embodiments of the present invention can be explained below, by way of example, with reference to particular data abstraction models, such as a data abstraction model according to the framework of the '075 application. However, other embodiments can be implemented using other types of logical models which abstractly describe physical data. Accordingly, the present invention is not limited to a particular data abstraction model, including data abstraction models according to the framework of the '075 application, and various different logical models of physical data which abstractly describe the physical data are broadly contemplated.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Exemplary Date Processing Environment

Referring now to FIG. 1, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more applications 120 and an abstract model interface 130. The applications 120 and the abstract model interface 130 are software products comprising a plurality of instructions that are resident at various times in various memory and storage devices in the computer system 110. When read and executed by one or more processors 112 in the computer system 110, the applications 120 and the abstract model interface 130 cause the computer system 110 to perform the steps necessary to execute steps or elements embodying the various aspects of the invention.

The applications 120 (and more generally, any requesting entity, including the operating system 118) are configured to issue queries against a database 139. Illustratively, the database 139 is shown as part of a database management system (DBMS) 154 in storage 138. Although only one database is shown for simplicity, the DBMS 154 may include multiple databases. Further, the databases may be distributed relative to one another. According to one aspect, the DBMS 154 is configured to manage access to physical data in the database 139 on the basis of a physical security model 136, which is illustratively included with the database 139. However, it should be noted that the physical security model 136 can be provided separately. For instance, the physical security model 136 can be implemented as a separate component from the DBMS 154. All such different implementations are broadly contemplated.

The physical security model 136 generally provides limitations on users' abilities to access (e.g., view and/or modify) data in the database 139. The particular implementation of the physical security model 136 is not limiting of the present invention. In a particular embodiment, the physical security model 136 is implemented using SQL-based views. SQL-based views are logical tables which are created based on the underlying physical tables using SQL statements. The SQL-based views may be user-specific so that different users have access to different fields, whereby access of a particular user(s) to a particular field(s) can be restricted. However, it should be noted that such SQL-based views are different than the data abstraction model views discussed below. Further, the SQL-based views are merely illustrative and persons skilled in the art will recognize other physical security model implementations. By way of example, the physical security model 136 may include access control lists which define authorization levels associated with users and specific resources that the users can modify at those levels. Other examples of physical security model implementations include (i) mandatory access schemes used for trusted systems, and (ii) discretionary access systems used, for example, for Linux® and Microsoft Windows® file systems, which are well-known in the art and will, therefore, not be described in more detail. Still another example of a physical security model is described in U.S. patent application Ser. No. 10/901,593, filed Jul. 29, 2004 entitled "Security Model Using Security Domains in a Security Model Applied to Abstract Database" (Chinese wall security model), which is herein incorporated by reference in its entirety, The database 139 is representative of any collection of data regardless of the particular physical representation of the data. A physical representation of data defines an organizational schema of the data. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") can be composed using logical fields defined by the abstract model interface 130. A logical field defines an abstract view of data whether as an individual data item or a data structure in the form of, for example, a database table. Abstract queries are executed against the database 139 by a runtime component 134 which first transforms the abstract queries into concrete queries having a form consistent with the physical representation of the data contained in the database 139. Operation of the runtime component 134 is further described below with reference to FIGS. 2-5.

In one embodiment, the logical fields used in the abstract queries are defined by a data abstraction model component 132 of the abstract model interface 130 which defines a multiplicity of logical fields. Access to the logical fields of the data abstraction model 132 is managed by a data abstraction model (DAM) security management component 150 on the basis of a logical security model 152. In one embodiment, the DAM security management component 150 creates the logical security model 152 based on the physical security model 136, as will be described in more detail below.

The DAM security management component 150 is illustratively shown as part of the abstract model interface 130. However, various other implementations are broadly contemplated. For instance, the DAM security management component 150 and/or the logical security model 152 can also be implemented as part of the DBMS 154. Operation of the DAM security management component 150 is further described below with reference to FIGS. 10-13.

Logic/Runtime View of Environment

Figure 2:
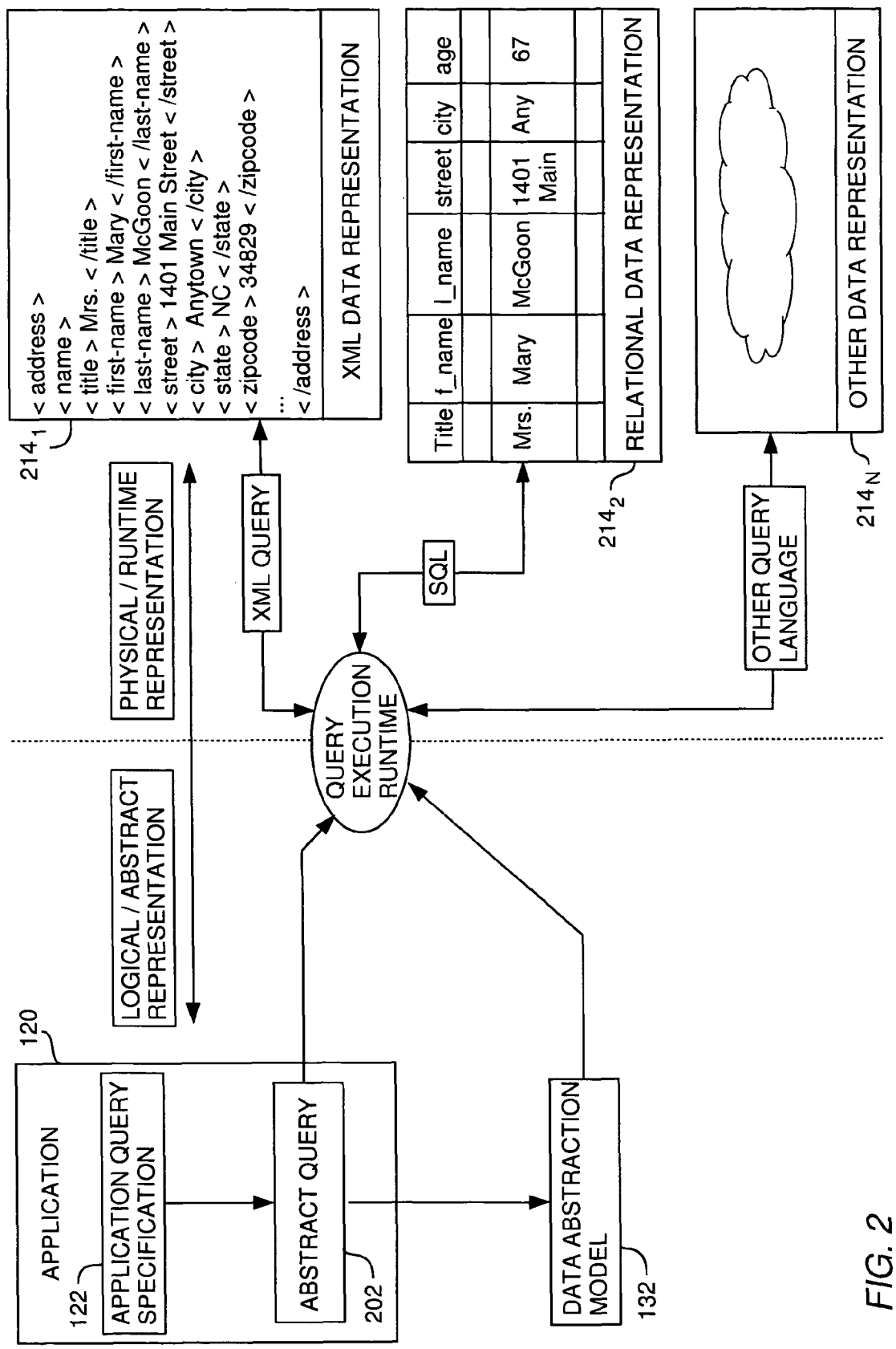
FIGS. 2-3 are relational views of software components in one embodiment.
Figure 3:
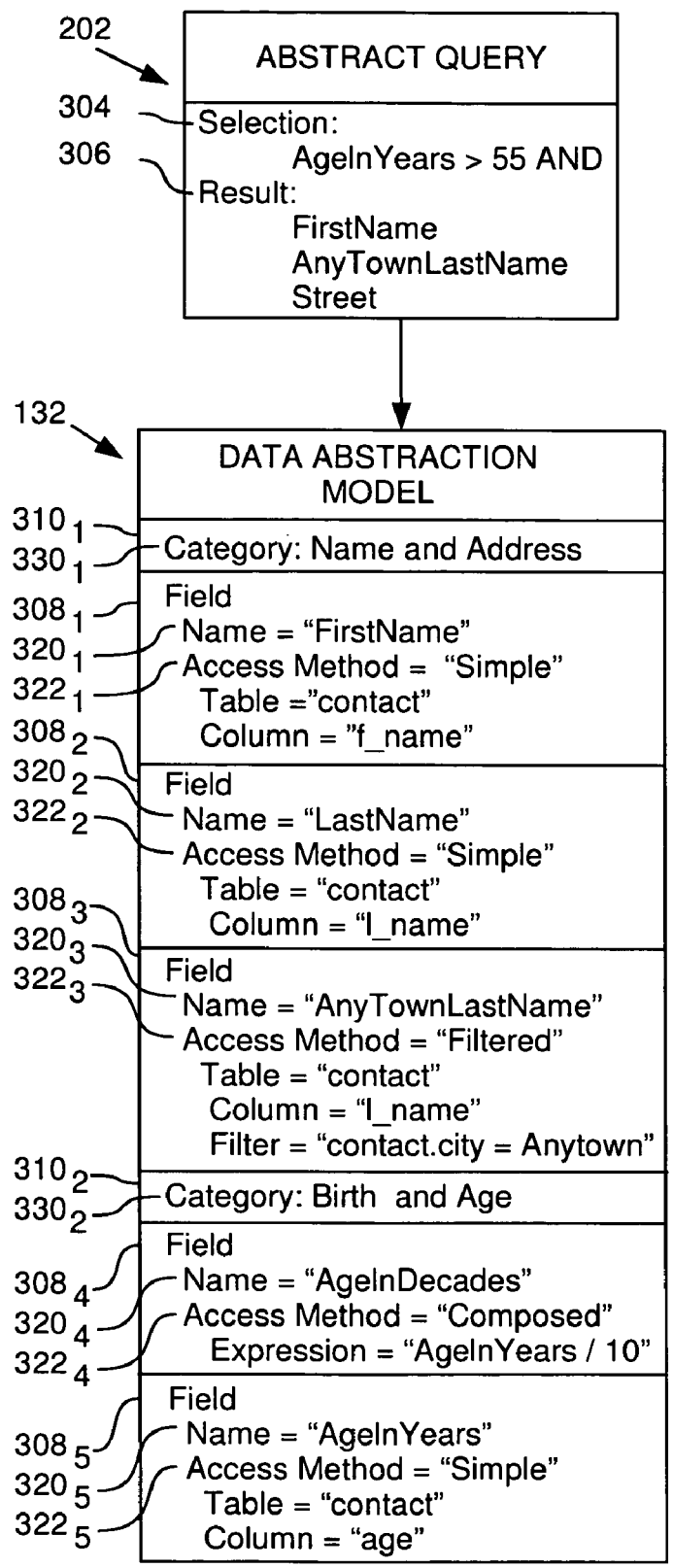

FIGS. 2-3 show an illustrative relational view of the applications 120, the application query specifications 122 and the data abstraction model 132 of FIG. 1 and other components of the invention. A requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 122 may include both criteria used for data selection (selection criteria 304) and an explicit specification of the fields to be returned (return data specification 306) based on the selection criteria 304, as illustrated in FIG. 3.

As was noted above, the logical fields specified by the application query specification 122 and used to compose the abstract query 202 are defined by the data abstraction model 132. In general, the data abstraction model 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in a corresponding database (e.g., database 139 of FIG. 1), thereby allowing queries to be formed that are loosely coupled to the underlying data representation.

In one embodiment, illustrated in FIG. 3, the data abstraction model 132 comprises a plurality of field specifications $308_1$, $308_2$, $308_3$, $308_4$ and $308_5$ (five shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 132 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 139 of FIG. 1). As illustrated in FIG. 2, the access methods associate the logical field names to a particular physical data representation $214_1$, $214_2$, ... $214_N$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 132 contains field specifications (with associated access methods) for two or more physical data representations 214. In an alternative embodiment, a different single data abstraction model 132 is provided for each separate physical data representation 214.

Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 3 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 3 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 132 shown in FIG. 3 are representative of logical fields mapped to data represented in the relational data representation $214_2$ shown in FIG. 2. However, other instances of the data abstraction model 132 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

```
001  <?xml version="1.0"?>
002  <!--Query string representation: (AgeInYears > "55"-->
003  <QueryAbstraction>
004    <Selection>
005      <Condition internalID="4">
006      <Condition field="AgeInYears" operator="GT" value="55"
007        internalID="1"/>
008    </Selection>
009    <Results>
010      <Field name="FirstName"/>
011      <Field name="AnyTownLastName"/>
012      <Field name="Street"/>
013    </Results>
014  </QueryAbstraction>
```

Illustratively, the abstract query shown in Table I includes a selection specification (lines 004-008) containing selection criteria and a results specification lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 3 is shown in Table II below. By way of illustration, the illustrative Data Abstraction Model is defined using XML. However, any other language may be used to advantage.

By way of example, note that lines 004-008 correspond to the first field specification $308_1$ of the DAM 132 shown in FIG. 3 and lines 009-013 correspond to the second field specification $308_2$.

As was noted above, the abstract query of Table I can be transformed into a concrete query for query execution. An exemplary method for transforming an abstract query into a concrete query is described below with reference to FIGS. 4-5.

Transforming an Abstract Query into a Concrete Query

Figure 4:
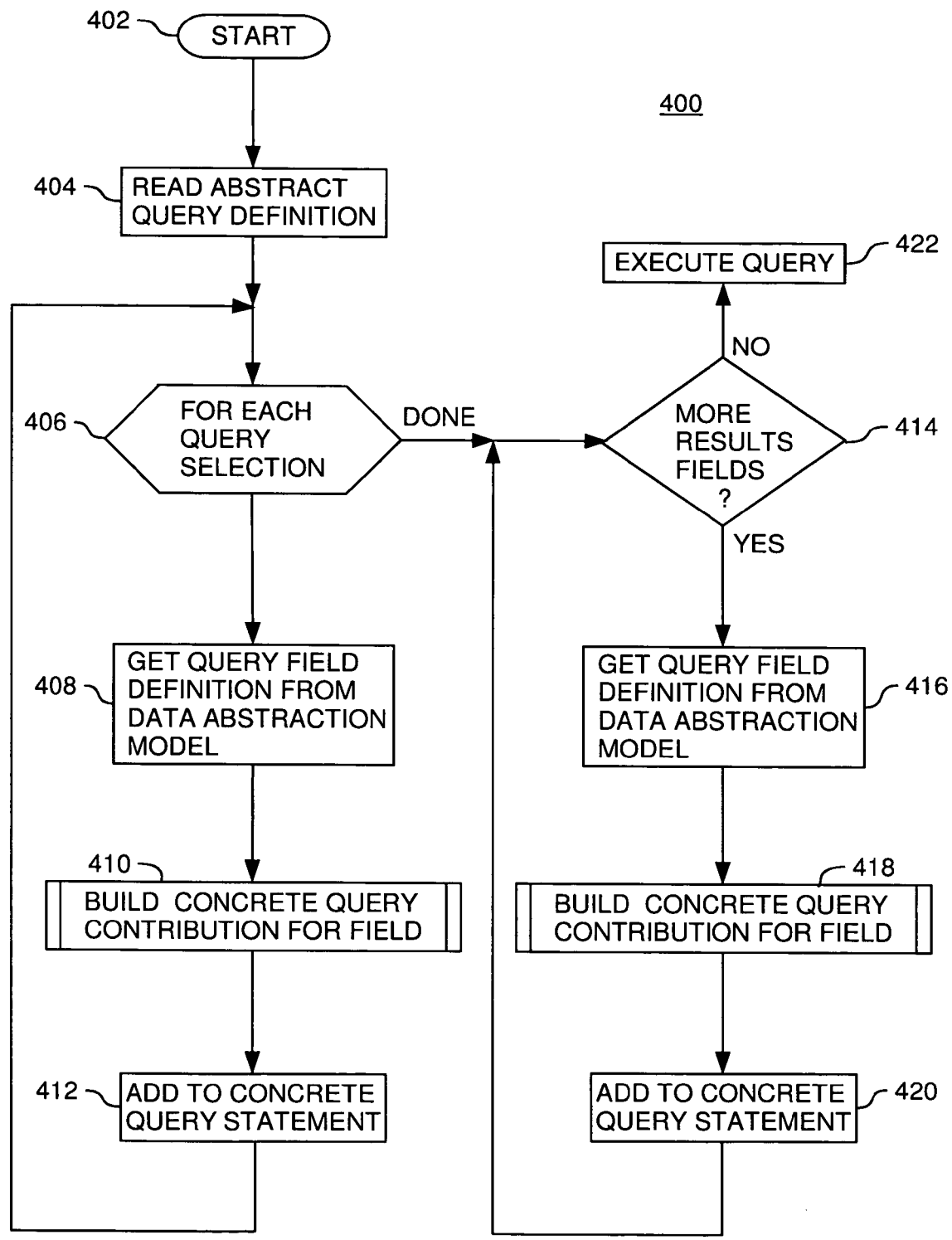
FIGS. 4-5 are flow charts illustrating the operation of a runtime component.

Referring now to FIG. 4, an illustrative runtime method 400 exemplifying one embodiment of the operation of the runtime component 134 of FIG. 1 is shown. The method 400 is entered at step 402 when the runtime component 134 receives as input an abstract query (such as the abstract query shown in Table I). At step 404, the runtime component 134 reads and parses the abstract query and locates individual selection criteria and desired result fields. At step 406, the runtime component 134 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 134 uses the field name from a selection criterion of the abstract query to look up the definition of the field in the data abstraction model 132. As noted above, the field definition includes a definition of the access method

TABLE II

DATA ABSTRACTION MODEL EXAMPLE

```
001  <?xml version="1.0"?>
002  <DataAbstraction>
003    <Category name="Name and Address">
004      <Field queryable="Yes" name="FirstName" displayable="Yes">
005        <AccessMethod>
006          <Simple columnName="f_name" tableName="contact"></Simple>
007        </AccessMethod>
008      </Field>
009      <Field queryable="Yes" name="LastName" displayable="Yes">
010        <AccessMethod>
011          <Simple columnName="l_name" tableName="contact"></Simple>
012        </AccessMethod>
013      </Field>
014      <Field queryable="Yes" name="AnyTownLastName" displayable="Yes">
015        <AccessMethod>
016          <Filter columnName="l_name" tableName="contact">
017  </Filter="contact.city=Anytown">
018        </AccessMethod>
019      </Field>
020    </Category>
021    <Category name="Birth and Age">
022      <Field queryable="Yes" name="AgeInDecades" displayable="Yes">
023        <AccessMethod>
024          <Composed columnName="age" tableName="contact">
025        </Composed Expression="columnName/10">
026        </AccessMethod>
027      </Field>
028      <Field queryable="Yes" name="AgeInYears" displayable="Yes">
029        <AccessMethod>
030          <Simple columnName="age" tableName="contact"></Simple>
031        </AccessMethod>
032      </Field>
033    </Category>
034  </DataAbstraction>
``` used to access the data structure associated with the field. The runtime component 134 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 134 looks up a result field name (from the result specification of the abstract query) in the data abstraction model 132 and then retrieves a result field definition from the data abstraction model 132 to identify the physical location of data to be returned for the current logical result field. The runtime component 134 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
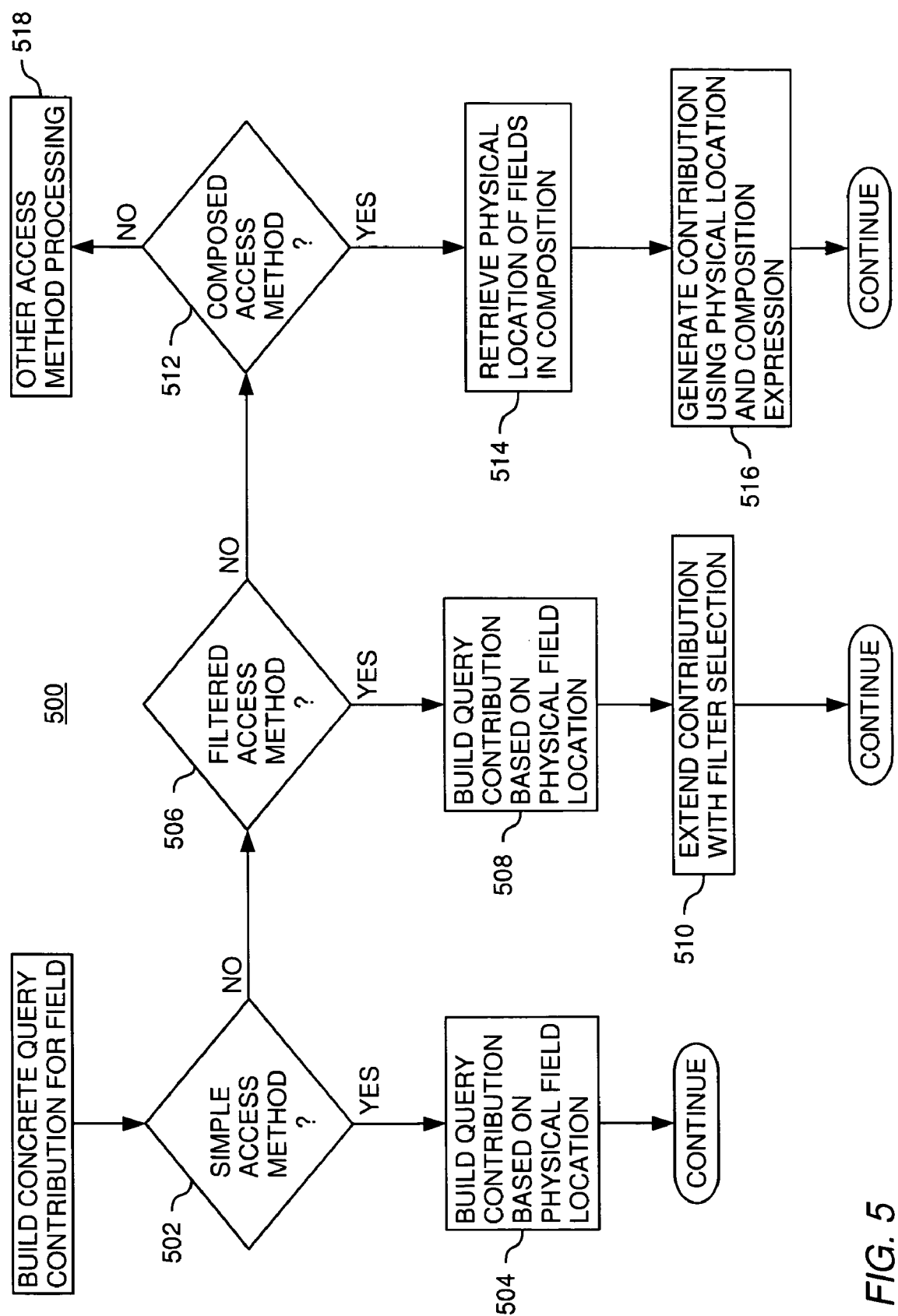

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Applications of Data Abstraction Models and Views

As noted above, in one embodiment a single data abstraction model (e.g., data abstraction model 132 of FIGS. 2-3) contains field specifications with associated access methods (e.g., field specifications 308 of FIG. 3 having access methods 322) for two or more physical data representations 214. In an alternative embodiment, a different single data abstraction model 132 is provided for each separate physical data representation 214. However, it should be noted that various configurations can be implemented and are, thus, broadly contemplated. For instance, in one embodiment multiple data abstraction models may coexist in a single application space, each data abstraction model being provided for two or more physical data representations 214. A corresponding environment is described below with reference to FIG. 6.

Figure 6:
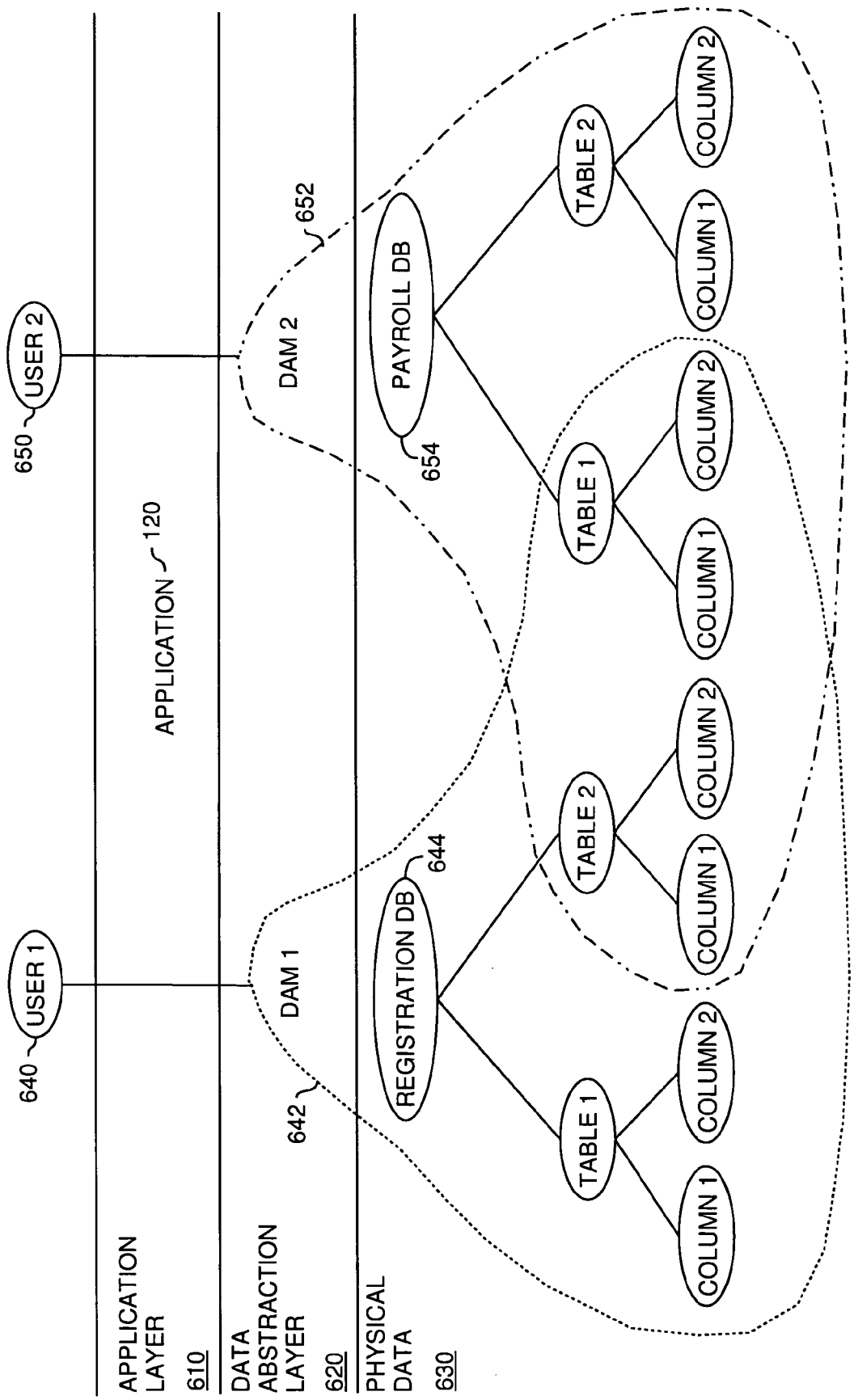
FIG. 6 illustrates one embodiment in which multiple data abstraction models coexist in a single application space.

FIG. 6 illustrates an environment which generally includes an application layer 610 (defined by the application 120 of FIG. 1), a data abstraction layer 620, and a physical data layer 630. The environment shows two users 640 "USER 1" and 650 "USER 2" accessing the physical data layer 630 via the application layer 610 using, e.g., application 120 of FIG. 1 (e.g., by issuing abstract query 202 of FIG. 2). Accordingly, the application layer 610 may comprise a data query builder component adapted to enable the users to build abstract queries.

The users 640, 650 are accessing the same physical data layer 630 through a common application layer 610. However, the data being exposed to the respective users 640, 650 is not the same. Rather, each user is exposed to selected portions of the physical data layer 630 according to the definition of the data abstraction layer 620. More particularly, the data abstraction layer 620 illustratively includes two data abstraction models, DAM1 642 and DAM2 652, which define the data that will be exposed to the users 640, 650, respectively, via the application layer 610. The data abstraction layer 620 may comprise a data query abstraction component which services logical data access of the data query builder component to the physical data in physical data layer 630.

In the present example, the first data abstraction model 642 (DAM1) exposes all of a first database 644 "REGISTRATION DATABASE" and TABLE 1 of a second database 654 "PAYROLL DATABASE", while the second data abstraction model 652 (DAM2) exposes the entire second database 654 and TABLE 2 of the first database 644. It should be noted that the particular data exposed by the respective data abstraction models is merely illustrative. More generally, any portion of the databases 644, 654 may be exposed, as well as any other databases of the physical data layer 630. By way of illustration, the environment of FIG. 6 shows two users (640, 650). However, more generally any number of users may be accessing the data of the physical data layer 630.

Figure 7:
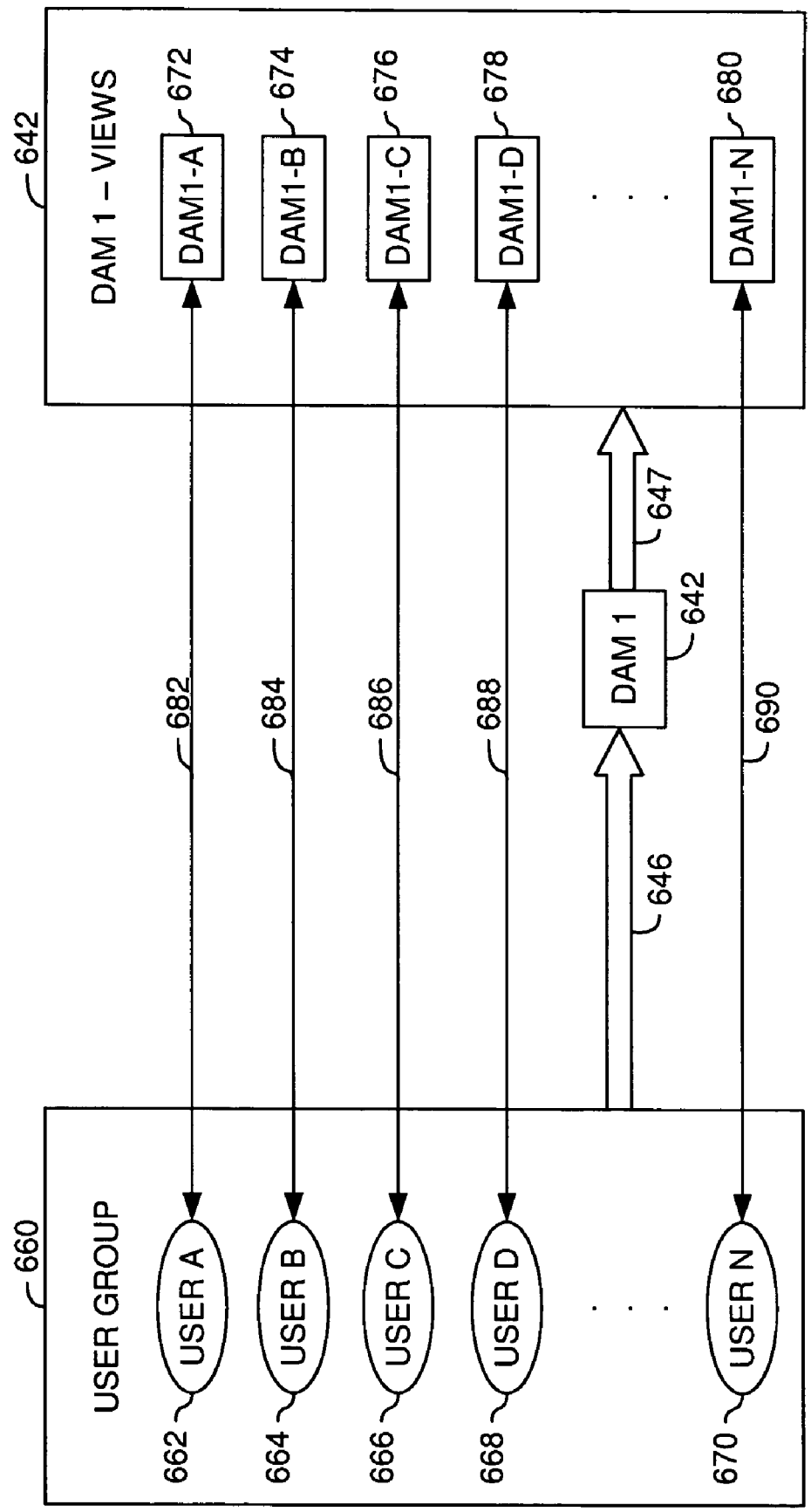
FIG. 7 illustrates one embodiment in which multiple instances of a single data abstraction model coexist in a single application space.

Referring now to FIG. 7, an embodiment is illustrated in which multiple instances of a given data abstraction model (e.g., data abstraction model 132 of FIG. 1) coexist in a single application space. Specifically, the multiple instances coexist independent of whether only the given data abstraction model or one or more other data abstraction models exist in the single application space. By way of example, a group 660 of users accesses the data abstraction model 642 "DAM1" of FIG. 6, as illustrated by arrow 646. Illustratively, the group 660 of users includes five users, a user 662 "USER A", 664 "USER B", 666 "USER C", 668 "USER D", and 670 "USER N".

For each user 662, 664, 666, 668, 670 accessing the data abstraction model 642, an instance of the data abstraction model 642 is created (as indicated by arrow 647). Each instance defines a specific view of the data abstraction model 642 for a given user. Providing such a specific view of the data abstraction model 642 to each user allows adapting the data abstraction model 642 to the needs and specific requirements of the user without globally changing the data abstraction model 642 for all users in the group 660. In one embodiment, the various instances of a given DAM are created by imposing a filter (or "view") over the given DAM, thereby exposing selected portions of the DAM. In some embodiments, the filter may in fact redefine attributes of the exposed DAM. Examples of these and other aspects follow.

Illustratively, a group 648 of data abstraction model instances 672 "DAM1-A", 674 "DAM1-B", 676 "DAM1-C", 678 "DAM1-D" and 680 "DAM1-N" defining different views of the DAM 642 is generated. The DAM instances 672, 674, 676, 678 and 680 are generated for the users 662, 664, 666, 668 and 670, respectively, as indicated by arrows 682, 684, 686, 688 and 690. By way of example, assume that the DAM instance 672 "DAM1-A" shows all logical fields as defined in the data abstraction model 642 to the user 662. The DAM instance 674 "DAM1-B" hides a logical field related to COLUMN 1 of TABLE 1 of the database 644 to the user 664, but shows all remaining logical fields as defined in the data abstraction model 642. The DAM instance 676 "DAM1-C" shows all logical fields of the data abstraction model 642 to the user 666, but a logical field related to COLUMN 2 of TABLE 1 of the database 644 is redefined. More specifically, assume that the logical field related to COLUMN 2 of TABLE 1 is originally defined in the data abstraction model 642 as a New York ZIP code field that maps to a physical representation of ZIP codes and restricts the data only to those ZIP codes defined for the state of New York. Assume further that the redefined field restricts the data to ZIP codes defined for the state of Minnesota (MN). Furthermore, the DAM instance 678 "DAM1-D" shows all logical fields as defined in the data abstraction model 642 and additionally shows a logical field related to COLUMN 1 of TABLE 2 of the database 654 to the user 668. Assume finally that the DAM instance 680 "DAM1-N" hides a logical field related to COLUMN 2 of TABLE 1 of the database 644 to the user 670, but shows all remaining logical fields as defined in the data abstraction model 642 and additionally shows a logical field related to COLUMN 2 of TABLE 2 of the database 654.

Figure 8:
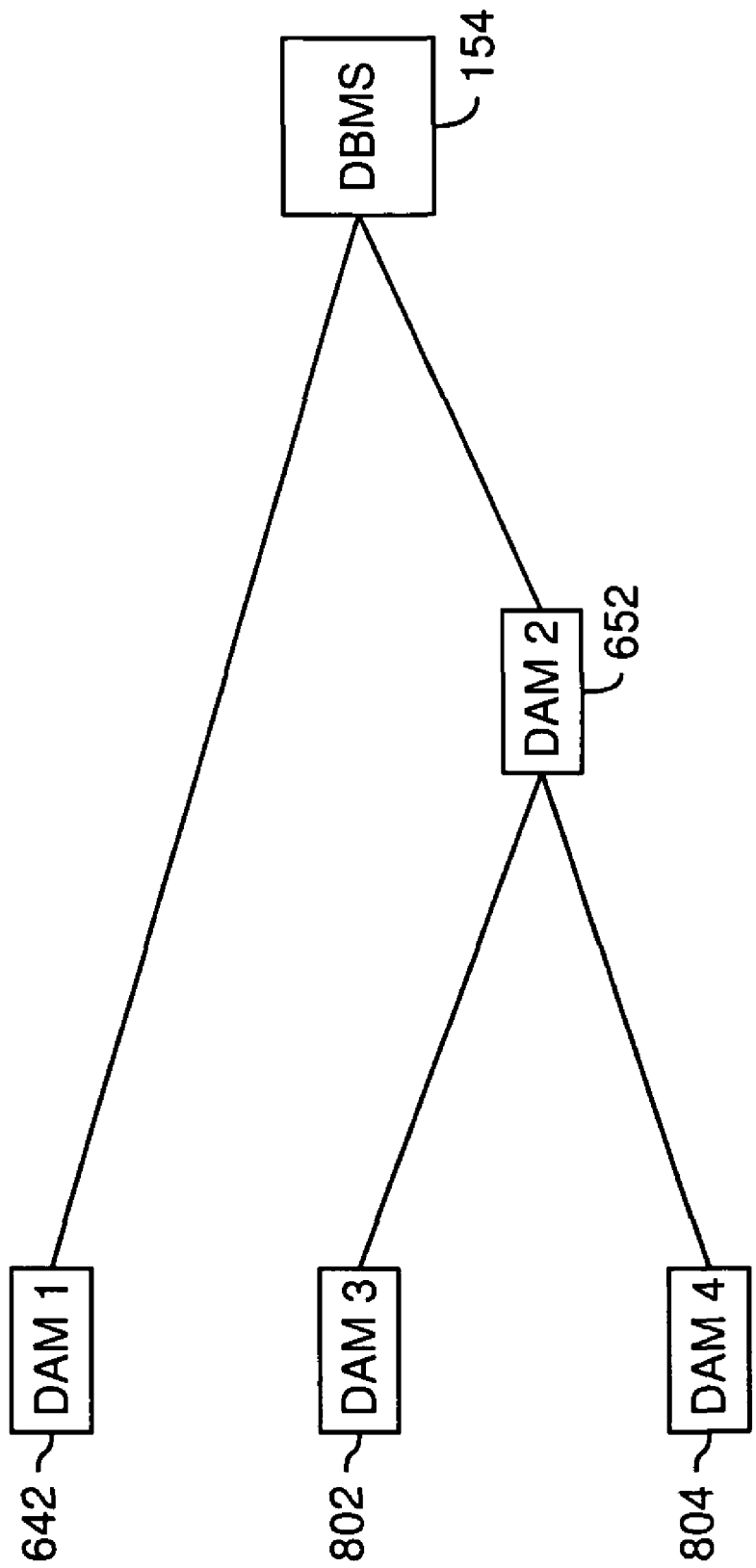
FIG. 8 illustrates an environment with plural data abstraction models.

As noted above, multiple data abstraction models may coexist in a single application space. Furthermore, multiple instances of a given data abstraction model may coexist in a single application space. Moreover, in one embodiment different data abstraction models may reference one another. An exemplary embodiment in which a plurality of data abstraction models reference one another is illustrated in FIG. 8. Specifically, the second data abstraction model DAM2 652 of FIG. 6 is illustrated as a parent with respect to a third data abstraction model DAM3 802 (a child) and a fourth data abstraction model DAM4 804. In this relationship, the third and/or fourth data abstraction models DAM3 802 and DAM4 804 may inherit a portion of the definition of the second data abstraction model DAM2 652. In more detail, a portion of the logical fields provided in the second data abstraction model DAM2 652, which is not included with the third and/or fourth data abstraction models DAM3 802 and DAM4 804 may be included therein by inheritance. Alternatively, the third and/or fourth data abstraction models DAM3 802 and DAM4 804 may override portions of the second data abstraction model DAM2 652 and/or include additional definitions, e.g., logical fields not found in the second data abstraction model DAM2 652. Still alternatively, the second data abstraction model DAM2 652 may be constructed by a combination of the definitions and/or logical fields comprised in the third and fourth data abstraction models DAM3 802 and DAM4 804.

As was noted above, one or more views of the DAM 642 can be provided in order to adapt the DAM 642 to the needs and specific requirements of different users without globally changing the DAM 642 for all users in a given group (e.g., group 660 of FIG. 6). By applying a given view to the DAM 642, an effective DAM can be created, as described in more detail below with reference to FIG. 9.

Figure 9:
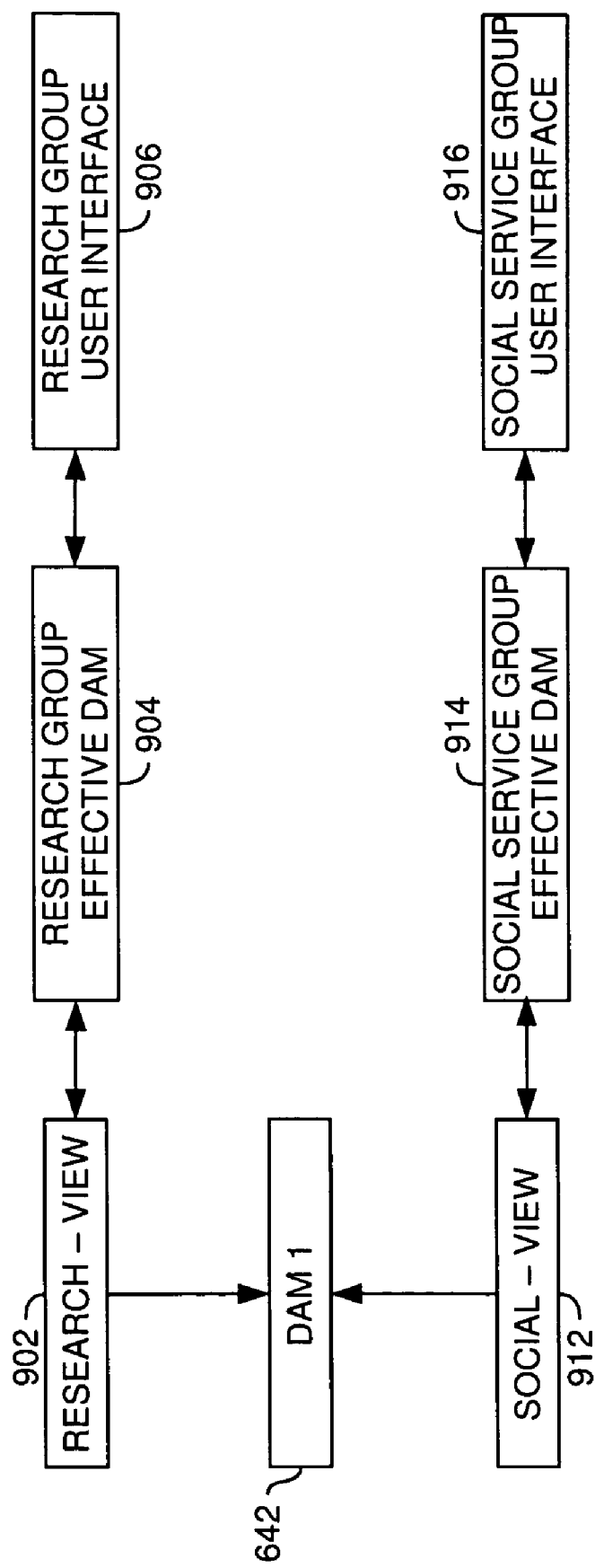
FIG. 9 illustrates one embodiment in which effective data abstraction models are created from a single data abstraction model using different views.

Referring now to FIG. 9, a relational view illustrating generation of effective data abstraction models from the DAM 642 of FIG. 6 in one embodiment is shown. More specifically, FIG. 9 shows the DAM 642 "DAM1" and two different views of the DAM 642. As was noted above, a view of the DAM 642 defines how the DAM 642 is presented to a user. By applying a given view to the DAM 642, an effective DAM is generated for presentation to a given user. An effective DAM of the DAM 642 contains a tree of nodes. Each node represents a logical field or category of the DAM 642. However, not all logical fields and/or categories of the DAM 642 need to be represented in the effective DAM. More specifically, each node has an attribute of being included or excluded in/from the effective DAM. A given "include" or "exclude" attribute applies to any child of a corresponding parent node unless the child is itself explicitly defined to be included or excluded. That is, the child inherits the attribute of the parents, unless the child overrides the parent's attribute with an explicit attribute of its own. The include or exclude attributes of nodes are defined in a corresponding view which is used to filter out excluded logical fields and/or categories from the DAM 642 when generating the effective DAM, as described in more detail below.

According to one aspect, the view may reflect access rights for a specific user and/or group of users according to a logical security model (e.g., logical security model 152 of FIG. 1) associated with the DAM 642. Accordingly, using different views of the DAM 642 according to the logical security model, users can be authorized to access information in the DAM 642 based on a corresponding authorization level assigned to the users and/or their respective user group(s). For simplicity, only two views are shown, i.e., a "RESEARCH-VIEW" 902 and a "SOCIAL-VIEW" 912. By way of example, the "RESEARCH-VIEW" 902 defines a view of the DAM 642 for users in a research group and the "SOCIAL-VIEW" 912 defines a view for users in a social service group.

By applying the view 902 to the data abstraction model 642, an effective data abstraction model "RESEARCH GROUP EFFECTIVE DAM" 904 can be created for a research group user using the "RESEARCH-VIEW" 902. An effective data abstraction model is an in-memory representation of a base data abstraction model (e.g., "DAM 1" 642) as modified by applying a view thereto and/or by aggregating multiple data abstraction models into a single larger data abstraction model. The effective data abstraction model 904 can be displayed in a user interface 906. Thus, the user interface 906 is displayed in accordance with the access rights which are assigned to users in the research group.

Similarly, for a social service group user using the "SOCIAL-VIEW" 912, an effective data abstraction model "SOCIAL SERVICE GROUP EFFECTIVE DAM" 914 can be created and displayed in a user interface 916. Thus, the user interface 916 is displayed in accordance with the access rights which are assigned to users in the social service group. The data abstraction model 642, the views 902 and 912, the effective data abstraction models 904 and 914 and the user interfaces 906 and 916 are explained in more detail below with respect to Tables III-X.

As an example of the data abstraction model "DAM 1" 642, the exemplary data abstraction model "DAM1.xml" shown in Table III below is illustrated. For simplicity, elements of the data abstraction model are represented in a shorthand format. Persons skilled in the art will readily recognize corresponding XML representations. Further, for brevity, only parts that are relevant for the following explanations are shown. It is noted that this manner of presentation applies to other tables described below as well.

TABLE III

DAM1 EXAMPLE

| | |
|---|---|
| 001 | DAM1.xml |
| 002 | +---> Demographic: Patient demographic information |
| 003 |   +--> Gender |
| 004 |     +-->Value: Female |
| 005 |     +-->Value: Male |
| 006 |     +-->Value: Unknown |
| 007 |   +--> Name |
| 008 |   +--> SSN: This is the patient's social security number |
| 009 | +---> Diagnosis: Patient diagnostic information |
| 010 |   +--> Disease |
| 011 |     +--> Name |

As can be seen from lines 002 and 009, the exemplary data abstraction model includes two categories, i.e., "Demographic" and "Diagnosis". Furthermore, the exemplary data abstraction model includes two "Name" attributes (lines 007 and 011).

As an example of the "RESEARCH-VIEW" 902, an exemplary view of the data abstraction model of Table III for users of a research group is shown in Table IV below. Further, for brevity, only parts that are relevant for the following explanations are shown.

TABLE IV

RESEARCH-VIEW EXAMPLE

| | | |
|---|---|---|
| 001 | RESEARCH-VIEW.damv | |
| 002 | +---> Exclude | |
| 003 | | +--> Demographic: SSN |

By way of example, it is assumed that researchers should be prevented from seeing Social Security numbers (SSN) for security reasons. Accordingly, as can be seen from line 002, the view of Table IV includes an "Exclude" attribute to exclude the logical field "SSN" of the "Demographic" category (line 003) from the presentation of the data abstraction model 642 for display. In other words, the exemplary RESEARCH-VIEW is configured to implement access rights for users of the RESEARCH group.

By applying the view of Table IV to the data abstraction model of Table III, an effective data abstraction model as illustrated in Table V below can be generated for users of the research group and displayed in the user interface 906. The exemplary effective data abstraction model illustrated in Table V is an example for the effective data abstraction model 904. For simplicity, only relevant displayed information is illustrated in Table V.

TABLE V

RESEARCH GROUP EFFECTIVE DAM EXAMPLE

| | |
|---|---|
| 001 | +---> Demographic: Patient demographic information |
| 002 |   +--> Gender |
| 003 |     +-->Value: Female |
| 004 |     +-->Value: Male |
| 005 |     +-->Value: Unknown |
| 006 |   +--> Name |
| 007 | +---> Diagnosis: Patient diagnostic information |
| 008 |   +--> Disease |
| 009 |     +--> Name |

As can be seen from Table V, the SSN information of the data abstraction model of Table III has been excluded.

As an example of the "SOCIAL-VIEW" 912, an exemplary view of the data abstraction model of Table III for users of the social service group is shown in Table VI below. Further, for brevity, only parts that are relevant for the following explanations are shown.

TABLE VI

SOCIAL-VIEW EXAMPLE

| | |
|---|---|
| 001 | SOCIAL-VIEW.damv |
| 002 | +---> IncludeAll |

By way of example, it is assumed that social service group users would need to access all information included in the "DAM 1" 642. Accordingly, as can be seen from line 002, the view of Table VI includes an "IncludeAll" attribute to include all logical fields of the data abstraction model 642 for display.

According to the view of Table VI, the effective data abstraction model of Table VII below can be generated for users of the social service group and displayed in the user interface 916. The exemplary data abstraction model of Table VII is an example for the effective data abstraction model 914. For simplicity, only relevant displayed information is illustrated in Table VII.

TABLE VII

SOCIAL SERVICE GROUP EFFECTIVE DAM EXAMPLE

| | |
|---|---|
| 001 | +---> Demographic: Patient demographic information |
| 002 |   +--> Gender |
| 003 |     +-->Value: Female |
| 004 |     +-->Value: Male |
| 005 |     +-->Value: Unknown |
| 006 |   +--> Name |
| 007 |   +--> SSN: This is the patient's social security number |
| 008 | +---> Diagnosis: Patient diagnostic information |
| 009 |   +--> Disease |
| 010 |     +--> Name |

As can be seen from Table VII, all information of the data abstraction model of Table III has been included. In other words, in the given example the effective DAM for users of the social service group corresponds to the exemplary data abstraction model "DAM 1" illustrated in Table III.

As was noted above, a given view may reflect access rights according to a logical security model (e.g., logical security model 152 of FIG. 1) associated with a given DAM (e.g., DAM 132 of FIG. 1) which abstractly describes physical data. The logical security model can be created based on a physical security model (e.g., physical security model 136 of FIG. 1) which is associated with the physical data and defines user access rights to the physical data. Creation of a logical security model based on a physical security model and use thereof is described below with reference to FIGS. 10-13.

Creating a Logical Security Model

Figure 10:
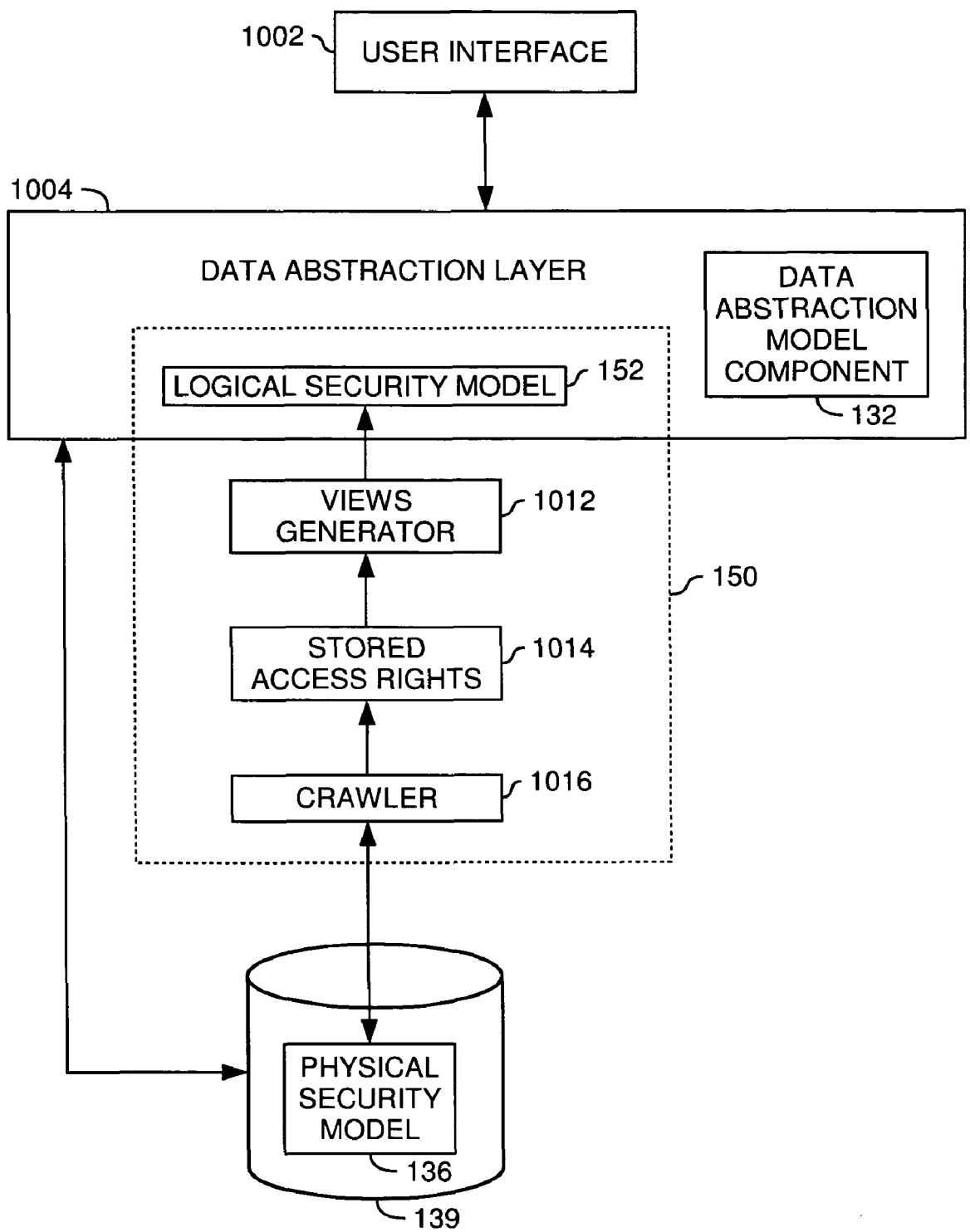
FIG. 10 is a relational view of software components in one embodiment.

Referring now to FIG. 10, a relational view of components implementing one aspect of the invention is illustrated. The components illustratively include a user interface 1002 (e.g., user interface 906 or 916 of FIG. 9), a data abstraction layer 1004 (e.g., data abstraction layer 620 of FIG. 6) having the DAM 132 and the logical security model 152 of FIG. 1, a views generator 1012, stored access rights 1014, a crawler 1016, and the database 139 of FIG. 1 having the physical security model 136 of FIG. 1. As indicated by dashed box 150, the logical security model 152, the views generator 1012, the stored access rights 1014, and the crawler 1016 implement constituent functions of the DAM security management component 150 of FIG. 1.

By way of example, the data abstraction layer 1004 is configured to expose selected portions of physical data in the database 139 to users according to the data abstraction model 132. The data abstraction model 132 is associated with the logical security model 152 which is used to manage access to logical fields of the data abstraction model 132. By managing access to the logical fields of the data abstraction model 132, access to the physical data of the database 139 via the data abstraction model 132 is managed.

In one embodiment, the logical security model 152 is created based on the physical security model 136 which is used to manage access to the physical data in the database 139. To this end, the crawler 1016 explores the database 139 in order to identify physical access rights rules therefrom. According to one aspect, the physical access rights rules are defined by the physical security model 136. The physical access rights rules define access rights to the physical data of the database 139 for different user entities, such as named users and/or groups of users. The crawler 1016 stores the identified physical access rights rules as the stored access rights 1014. An exemplary method for identification of physical access rights rules and storage thereof is described below with reference to FIG. 11.

The views generator 1012 creates one or more views (e.g., views 672-680 of FIG. 7) on the basis of the stored access rights 1014. Each view defines one or more logical access rights rules, each corresponding to one or more of the stored access rights 1014. Accordingly, the one or more created views reflect the physical access rights rules to the physical data of the database 139 as defined by the physical security model 136.

In one embodiment, a generic view of a given DAM is created for an "all users" entity which restricts and/or grants access for/to at least a portion of the DAM 132 to users of the "all users" entity. Similarly, for each group of users a group-specific view is created and for at least a portion of all users, user-specific views are created, as described in more detail below with reference to FIG. 12.

The views generator 1012 further generates a mapping for each entity, such as a named user and/or user group, to an associated view which is to be applied to the DAM 132 upon user logon. In one embodiment, the mapping is stored in a logical authorization file. The logical authorization file and the created views constitute the logical security model 152.

Figure 12A:
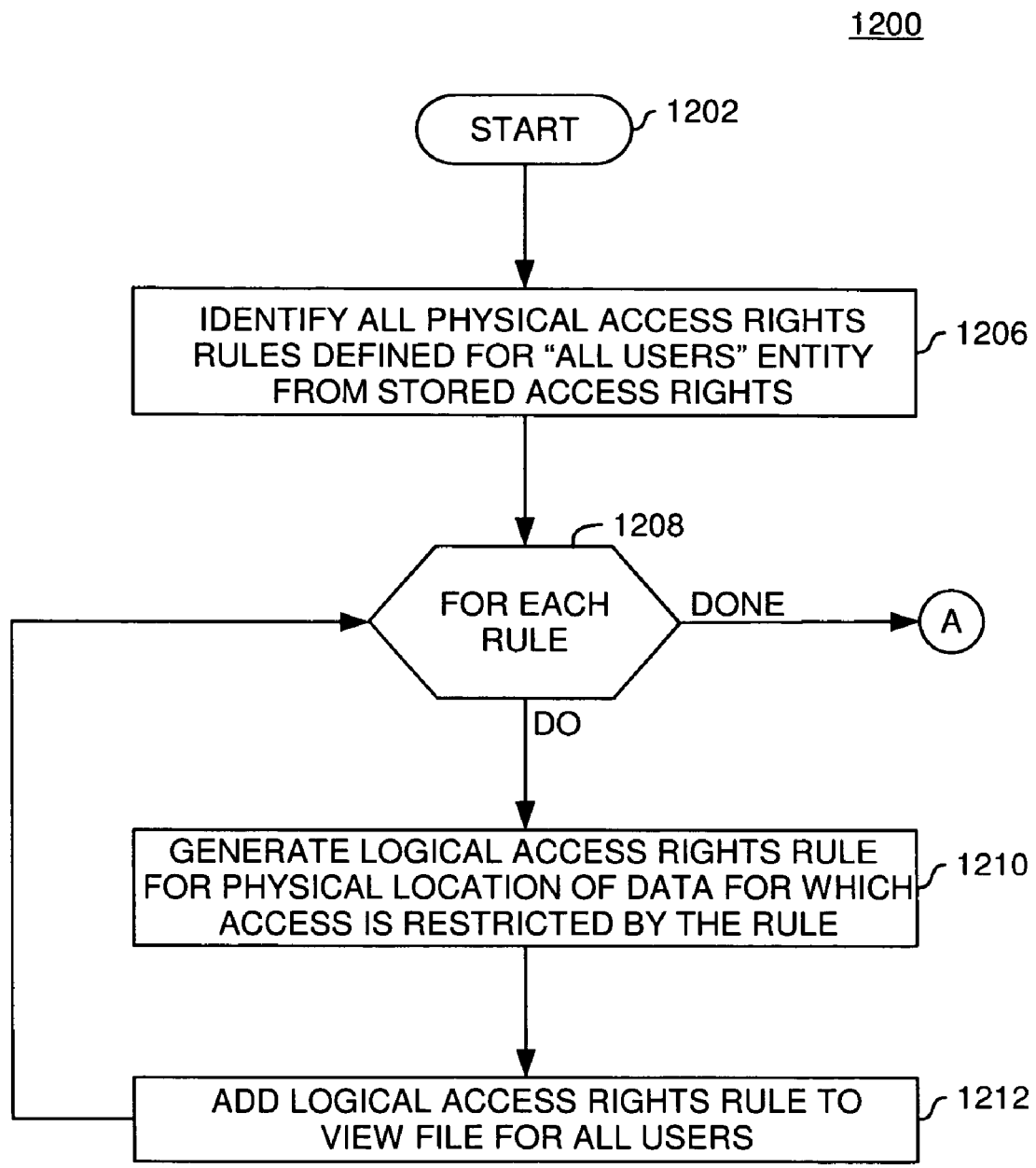
FIG. 12 is a flow chart illustrating creation of view files and a logical authorization file in one embodiment.
Figure 12B:
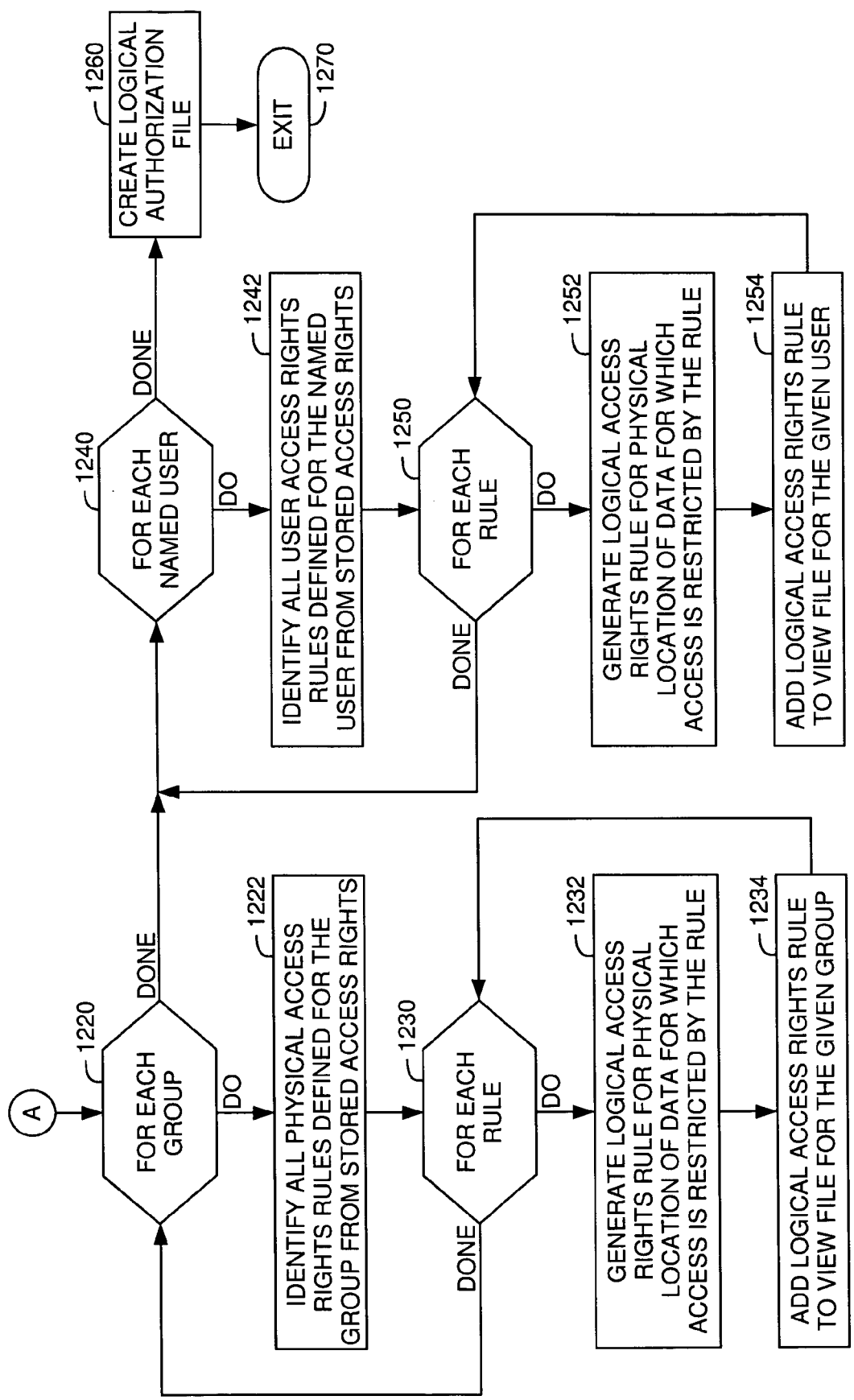

Creation of views and a logical authorization file defining a logical security model is described in more detail below with reference to FIG. 12.

In one embodiment, when a given user logs on, a mapping (s) for the given user is identified from the logical authorization file included with the logical security model 152. On the basis of the identified mapping(s), all applicable views for the given user are identified from the logical security model 152. The applicable view(s) are applied to the DAM 132 in order to restrict access of the given user to physical data in the database 139 exclusively to authorized information. By applying the applicable view(s) to the DAM 132, an effective DAM (e.g., effective DAM 904 or 914 of FIG. 1) is generated. The effective DAM is presented to the user in the user interface 1002. Identification and application of applicable views is described in more detail below with reference to FIG. 13.

Figure 11:
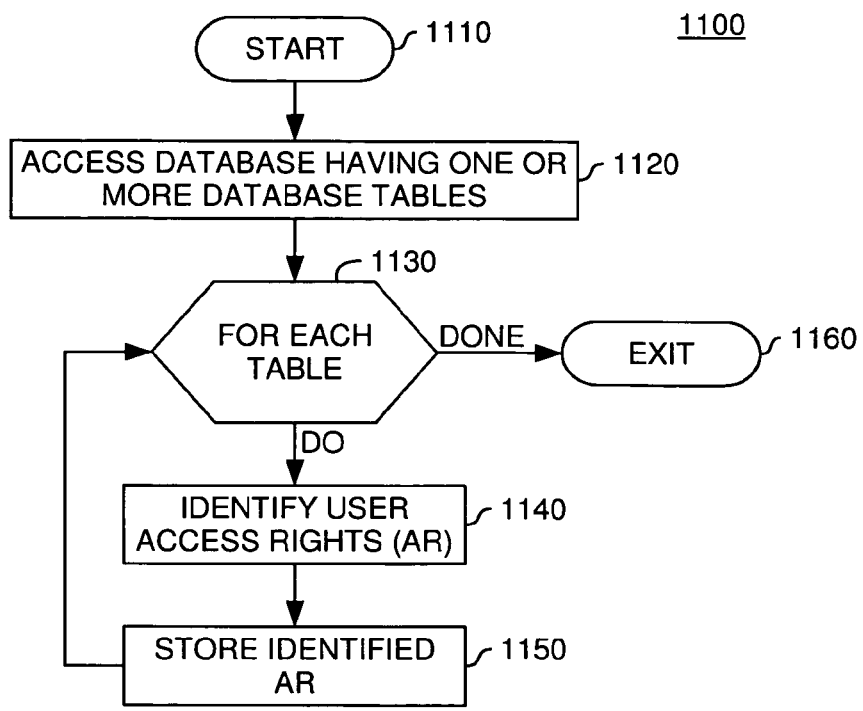
FIG. 11 is a flow chart illustrating identification of user access rights in one embodiment.

Referring now to FIG. 11, an exemplary method 1100 for identification of physical access rights rules is illustrated. In one embodiment, at least a portion of the steps of method 1100 is performed using a suitable crawler (e.g., crawler 1016 of FIG. 11). Method 1100 starts at step 1110.

At step 1120, an underlying database (e.g., database 139 of FIG. 1) is accessed and all database tables therefrom are identified. For instance, assume that in the example described above the exemplary DAM of Table III abstractly describes physical data of two different database tables. A first database table "Demographic" describes patient demographic information in a "gender", "name" and "ssn" column. The physical data in the "gender", "name" and "ssn" columns is accessible through the logical fields "Gender", "Name" and "SSN" (lines 003, 007 and 008 of Table III), respectively. A second database table "Diagnoses" describes patient diagnostic information in an "illness" column. The physical data in the "illness" column is accessible through the logical field "Disease" (line 010 of Table III).

For each identified database table, a loop consisting of steps 1130, 1140 and 1150 is performed. Assume that in the given example the loop is initially entered at step 1130 for the "Demographic" table. At step 1140, a physical security model (e.g., physical security model 136 of FIG. 1) is accessed which is associated with the underlying database. The physical security model includes a table access rights specification that is associated with the "Demographic" table. The table access rights specification includes the physical access rights rules for the "Demographic" table which can, thus, be identified therefrom.

Assume now that four different physical access rights rules for the "Demographic" table are identified: (A1) users of the "all users" entity in the hospital are allowed to access the "name" and "gender" columns, (A2) users of the social service group are allowed to access all columns, (A3) users of the research group are not allowed to access the "ssn" column, and (A4) user "Bob" is allowed to access the "ssn" column. By way of example, assume that the user "Bob" is a user of the research group who requires access to the Social Security numbers for his work. Accordingly, the user "Bob" is expressly granted access to the "ssn" column according to the identified physical access rights rule (A4).

It should be noted that in the given example three authorization levels are described: an "all users" level according to physical access rights rule (A1), a "group" level according to physical access rights rules (A2-A3), and a "named user" level according to physical access rights rule (A4). The "all users" level is directed towards users of the "all users" entity and is intended to provide general access rights for all users to information that is not associated with particular access restrictions. In general, users of the "all users" entity are only allowed to access general information, such as publicly available information. Accordingly, the "all users" authorization level is the lowest authorization level. In contrast, the "named user" level is the highest authorization level which expressly associates particular users with user-specific access rights. Accordingly, access rights defined at the "all users" level can be overridden by access rights defined at the "group" and/or "named user" level. Similarly, access rights defined at the "group" level can be overridden by access rights defined at the "named user" level. However, the granularity of the authorization levels may vary based on system and application-specific requirements.

Furthermore, it should be noted that the four identified physical access rights rules (A1)-(A4) are described in natural language for simplicity. However, these physical access rights rules can be implemented using any available machine-readable language. Accordingly, the implementation is not limited to a particular language and it is understood that any suitable machine-readable language, known or unknown, can be used and is, thus, broadly contemplated. Furthermore, various particular implementations of a given physical access rights rule are broadly contemplated. More specifically, physical access rights rules are generally implemented using two different types of instructions, i.e., "grant" and "revoke". A "grant" instruction expressly allows access to a specified data object and a "revoke" instruction expressly denies access to a specified data object. If access to a particular data object is neither expressly allowed using a "grant" instruction nor expressly denied using a "revoke" instruction, a corresponding physical access rights rule is termed to be "silent" on that particular data object. For instance, the physical access rights rule (A1) can be implemented as follows: (i) grant the users of the "all users" entity access to the "name" and "gender" columns and revoke access for these users to the "ssn" column, or (ii) grant the users of the "all users" entity access to the "name" and "gender" columns. It should be noted that the second implementation (ii) is silent on the "ssn" column. Accordingly, the users of the "all users" entity are not allowed to access' this column if no grant instruction is defined at a higher authorization level, as described in more detail below. In other words, if a physical access rights rule is silent on a particular data object, this can be understood as an implicit revoke of access to that particular data object.

At step 1150, the identified physical access rights rules (A1)-(A4) are stored (e.g., as stored access rights 1014 of FIG. 10). Processing then returns to step 1130, where the loop consisting of steps 1130-1150 is entered for a next identified database table. In the given example, the loop is re-entered at step 1130 for the "Diagnoses" table. Accordingly, at step 1140 the physical security model is accessed with respect to the "Diagnoses" table and physical access rights rules for the "Diagnoses" table are identified therefrom. Assume now that four different physical access rights rules are identified for the "Diagnoses" table: (B1) users of the "all users" entity in the hospital are not allowed to access the "illness" column, (B2) users of the social service group are allowed to access the "illness" column, (B3) users of the research group are allowed to access the "illness" column, and (B4) user "Fred" is not allowed to access the "illness" column. By way of example, assume that the user "Fred" is a user of the social service group who does not require access to the Social Security numbers for his work. Accordingly, for data security access to the "illness" column is expressly revoked for the user "Fred" according to physical access rights rule (B4).

At step 1150, the identified physical access rights rules (B1)-(B4) are stored. Processing then returns to step 1130, where the loop consisting of steps 1130-1150 is entered for a next identified database table. As in the given example the underlying database only includes two tables, all tables have been processed and, accordingly, method 1100 exits at step 1160.

On the basis of the stored access rights, i.e., the identified physical access rights rules, logical access rights definitions for logical access rights rules can be created. More specifically, in one embodiment a plurality of views defining the logical access rights rules is created. Furthermore, a logical authorization file including mappings from user entities to views that are to be applied to a corresponding DAM (i.e., the exemplary DAM of Table III) upon user logon is created. An exemplary method 1200 for creation of logical access rights rules and a corresponding logical authorization file is now described with reference to FIG. 12. In one embodiment, at least a portion of the steps of method 1200 is performed using a suitable views generator (e.g., views generator 1012 of FIG. 10). Method 1200 starts at step 1202.

Then, in steps 1206, 1208, 1210 and 1212 logical access rights rules are created for a view which is valid for all users regardless of their respective group memberships and/or particular authorizations. In other words, a view is created which is applicable to users of the "all users" entity at the lowest authorization level, i.e., the "all users" level.

At step 1206, all physical access rights rules defined for the "all users" entity are identified from stored access rights (e.g., stored access rights 1014 of FIG. 10). According to one aspect, the physical access rights rules are identified from access rights which have been stored at step 1150 of FIG. 11. In the given example, the physical access rights rules (A1) and (B1) are identified for the "all users" entity.

At step 1208, a loop consisting of steps 1208, 1210 and 1212 is entered for each identified physical access rights rule. By way of example, assume that in the given example the loop is first entered for the rule (A1).

At step 1210, a logical access rights rule is created for the rule (A1). More specifically, the logical access rights rule is generated for a physical location of underlying physical data to which access is managed by the rule (A1). In one embodiment, the logical access rights rule corresponding to rule (A1) is defined using one or more XPath like expressions, although the particular syntax is not limiting of the invention and persons skilled in the art will recognize other suitable alternatives within the scope of the invention. In the illustrative embodiment, each XPath like expression defines a physical location of a field of the physical data for which an identified physical access rights rule exists. More specifically, assume that the rule (A1) is implemented as described above to grant the users of the "all users" entity to access to the "name" and "gender" columns and to revoke access for the users of the "all users" entity to the "ssn" column in the "Demographic" table. Accordingly, three XPath like expressions can be generated for the rule (A1) as illustrated in Table VIII below.

TABLE VIII

XPATH LIKE EXPRESSIONS EXAMPLE

001 *[@TABLE_NAME='Demographic' AND @COLUMN_NAME='name']
GRANT
002 *[@TABLE_NAME='Demographic' AND @COLUMN_NAME='gender']
GRANT
003 *[@TABLE_NAME='Demographic' AND @COLUMN_NAME='ssn']
REMOVE As can be seen from lines 001-003 of Table VIII, each XPath like expression has two parts: a first part which includes a specifier of a physical location and a second part which defines an action to be taken with respect to each logical field in the corresponding DAM which references the physical location. Illustratively, the action to be taken is either "GRANT" or "REMOVE". For instance, in the given example the XPath like expression of line 001 includes a specifier "@TABLE_NAME='Demographic' AND @COLUMN_NAME='name'". This specifier defines that any logical field (referred to by the "*[ ]" in line 001) in the exemplary DAM of Table III that references the "name" column (@COLUMN_NAME='name') in the "Demographic" table (@TABLE_NAME='Demographic') should be available, i.e., accessible, to the users of the "all users" entity as indicated by the GRANT action attribute. In contrast, according to line 003 any logical field in the exemplary DAM of Table III that references the "ssn" column (@COLUMN_NAME='ssn') in the "Demographic" table (@TABLE_NAME='Demographic') should be removed (as indicated by the REMOVE action attribute) in order to prevent access of the users of the "all users" entity to the physical data in the "ssn" column. In other words, an effective DAM which is created from the exemplary DAM of Table III for the users of the "all users" entity should display the logical fields "Gender" and "Name" (lines 003-007 of Table III), but not the logical field "SSN" (line 008 of Table III).

It should be noted that the action to be taken is illustratively described as a "GRANT" or "REMOVE" action. However, various modifications and variations are broadly contemplated to implement required actions to be taken according to logical access rights rules. For instance, a logical access rights rule can be silent with respect to a given physical location. However, if a logical access rights rule is silent with respect to a given physical location, whether this indicates an implicit revoke or grant of access to the given physical location can be defined, for instance, according to user- or system-specific requirements or preferences and is, therefore, not limiting of the present invention. By way of example, assume in the context of the present invention that if a logical access rights rule is silent on a particular data object, this can be understood as an implicit grant of access to that particular data object. Furthermore, more granular actions can be defined with respect to concerned logical fields. For instance, instead of removing the logical fields relevant attributes of the logical fields can be modified. By way of example, a "Displayable" attribute or a "Queryable" attribute can be set to "NO" to restrict access to underlying physical data. In one embodiment, setting the "Displayable" attribute of a given logical field to "NO" prevents underlying physical data from being viewed by a corresponding user, but allows the field to be queried on. For instance, the given field can be used as a condition field in an abstract query which does not display the underlying physical data. However, the given field cannot be used as a result field intended to display at least a portion of the underlying physical data. Furthermore, setting the "Queryable" attribute to "NO" prevents the corresponding field from being used as a condition field.

At step 1212, the generated logical access rights rule is added to a view which is applicable to the users of the "all users" entity. In the given example, assume that the XPath like expressions of Table VIII are added to a file "all_users.damv" which defines the view for the "all users" entity. In the present context, "damv" is used for purposes of illustration as an extension to view files and is shorthand for "DAM view". Processing then returns to step 1208, where the loop consisting of steps 1208, 1210 and 1212 is entered for a next identified physical access rights rule. Accordingly, in the given example the loop is entered for the rule (B1) and at step 1210 a logical access rights rule is created for the rule (B1).

Assume now that the rule (B1) is implemented to revoke access for the users of the "all users" entity to the "illness" column in the "Diagnoses" table. Accordingly, a single XPath like expression is generated for the rule (B1) as illustrated in Table IX below.

TABLE IX

XPATH LIKE EXPRESSION EXAMPLE

001  *[@TABLE_NAME='Diagnoses' AND @COLUMN_NAME='illness']
REMOVE

As can be seen from Table IX, the XPath like expression of line 001 defines that any logical field in the exemplary DAM of Table III that references the "illness" column (@COLUMN_NAME='illness') in the "Diagnoses" table (@TABLE_NAME='Diagnoses') should be removed in order to prevent access of the users of the "all users" entity to the physical data in the "illness" column. In other words, an effective DAM which is created from the exemplary DAM of Table III for the users of the "all users" entity should not display the logical field "Disease" (line 010 of Table III).

At step 1212, the generated logical access rights rule is added to the "all_users.damv" file which defines the view for the "all users" entity. Processing then returns to step 1208, where the loop consisting of steps 1208, 1210 and 1212 is entered for a next identified physical access rights rule. As in the given example all identified physical access rights rules for the "all users" entity have been processed, method 1200 continues at step 1220.

However, it should be noted that in particular embodiments steps 1206, 1208, 1210 and 1212 can be performed in a loop more than once. For instance, in an environment where a different single data abstraction model is provided for each underlying physical database, a separate loop consisting of the steps 1206, 1208, 1210 and 1212 can be performed for each underlying physical database.

At step 1220, a loop consisting of steps 1220, 1222, 1230, 1232 and 1234 is entered to create logical access rights rules for group-specific views which are valid for users of particular groups at the "group" authorization level. At step 1220, the loop consisting of steps 1220, 1222, 1230, 1232 and 1234 is initially entered for a first group and all physical access rights rules defined at the "group" authorization level for this first group are identified from the stored access rights at step 1222. Assume now that in the given example the loop is initially entered for the social service group. Accordingly, at step 1222 the physical access rights rules (A2) and (B2) are identified for the social service group.

At step 1230, a loop consisting of steps 1230, 1232 and 1234 is entered for each identified physical access rights rule of the social service group. By way of example, assume that in the given example the loop is first entered for the rule (A2). Then, at step 1232 a logical access rights rule is created for the rule (A2) as described above. At step 1234, the generated logical access rights rule is added to a view which is applicable to the social service group (e.g., "SOCIAL-VIEW" 912 of FIG. 9). In the given example, assume that the generated logical access rights rule is added to a file "view1.damv" which defines the view for users of the social service group.

Processing then returns to step 1230, where the loop consisting of steps 1230, 1232 and 1234 is entered for a next identified physical access rights rule of the social service group. Accordingly, in the given example the loop is entered for the rule (B2) and at step 1232 a logical access rights rule is created for the rule (B2).

Assume now that in the given example the logical access rights rules defined by the XPath like expressions of Table X below are generated for the social service group on the basis of the rules (A2) and (B2) and stored in the "view1.damv" file.

TABLE X

XPATH LIKE EXPRESSIONS EXAMPLE

001 *[@TABLE_NAME='Demographic' AND @COLUMN_NAME='name']
GRANT
002 *[@TABLE_NAME='Demographic' AND @COLUMN_NAME='gender']
GRANT
003 *[@TABLE_NAME='Demographic' AND @COLUMN_NAME='ssn']
GRANT 004 *[@TABLE_NAME='Diagnoses' AND @COLUMN_NAME='illness']
GRANT As can be seen from Table X, the XPath like expressions of lines 001-004 define that all logical fields of the exemplary DAM of Table III should be available, i.e., accessible, to the users of the social service group. In other words, an effective DAM (e.g., "SOCIAL SERVICE GROUP EFFECTIVE DAM" 914 of FIG. 9) which is created from the exemplary DAM of Table III for the users of the social service group should display all logical fields of the exemplary DAM of Table III, as described above by way of example with reference to Table VII.

Processing then returns to step 1220, where the loop consisting of steps 1220, 1222, 1230, 1232 and 1234 is entered for a next group. In the given example, the loop is entered for the research group and all physical access rights rules defined at the "group" authorization level for the research group are identified from the stored access rights at step 1222. Accordingly, at step 1222 the physical access rights rules (A3) and (B3) are identified for the research group.

At step 1230, the loop consisting of steps 1230, 1232 and 1234 is entered for each identified physical access rights rule of the research group. By way of example, assume that in the given example the loop is first entered for the rule (A3). Then, at step 1232 a logical access rights rule is created for the rule (A3) as described above. At step 1234, the generated logical access rights rule is added to a view which is applicable to the social service group (e.g., "RESEARCH-VIEW" 912 of FIG. 9). In the given example, assume that the generated logical access rights rule is added to a file "view2.damv" which defines the view for users of the research group.

Processing then returns to step 1230, where the loop consisting of steps 1230, 1232 and 1234 is entered for a next identified physical access rights rule of the research group. Accordingly, in the given example the loop is re-entered for the rule (B3) and at step 1232 a logical access rights rule is created for the rule (B3).

Assume now that in the given example the logical access rights rules defined by the XPath like expressions of Table XI below are generated for the research group on the basis of rules (A3) and (B3) and stored in the "view2.damv" file.

TABLE XI

XPATH LIKE EXPRESSIONS EXAMPLE

001 *[@TABLE_NAME='Demographic' AND @COLUMN_NAME='name']
GRANT
002 *[@TABLE_NAME='Demographic' AND @COLUMN_NAME='gender']
GRANT
003 *[@TABLE_NAME='Demographic' AND @COLUMN_NAME='ssn']
REMOVE 004 *[@TABLE_NAME='Diagnoses' AND @COLUMN_NAME='illness']
GRANT As can be seen from Table XI, the XPath like expressions of lines 001, 002 and 004 define that all logical fields of the exemplary DAM of Table III should be available to users of the research group, except the logical field that references the "ssn" column in the "Demographic" table (line 003). In other words, an effective DAM (e.g., "RESEARCH GROUP EFFECTIVE DAM" 904 of FIG. 9) which is created from the exemplary DAM of Table III for the users of the research group should display all logical fields of the exemplary DAM of Table III, except the logical field "SSN" (line 008 of Table III), as described above by way of example with reference to Table V.

Processing then returns to step 1220, where the loop consisting of steps 1220, 1222, 1230, 1232 and 1234 is entered for a next group. As in the given example all groups have been processed, method 1200 continues at step 1240.

At step 1240, a loop consisting of steps 1240, 1242, 1250, 1252 and 1254 is entered to create logical access rights rules for user-specific views which are valid for particular named users. In other words, a single user-specific view is created for each of one or more named users which is applicable at the "named user" authorization level.

At step 1240, the loop consisting of steps 1240, 1242, 1250, 1252 and 1254 is initially entered for a first named user and all physical access rights rules defined at the "named user" level for this first named user are identified from the stored access rights at step 1242. Assume now that in the given example the loop is initially entered for the user "Bob". Accordingly, at step 1242 the physical access rights rule (A4) is identified for this user.

At step 1250, a loop consisting of steps 1250, 1252 and 1254 is entered for each identified physical access rights rule of the user "Bob". In the given example the loop is entered at step 1250 for the rule (A4). Then, at step 1252 a logical access rights rule is created for the rule (A4) as described above. At step 1254, the generated logical access rights rule is added to a view which is applicable to the named user "Bob". In the given example, assume that the generated logical access rights rule is added to a file "bob.damv" which defines the view for the named user "Bob".

Processing then returns to step 1250, where the loop consisting of steps 1250, 1252 and 1254 is entered for a next identified physical access rights rule of the user "Bob". As in the given example only one physical access rights rule is identified for the named user "Bob", the loop is not re-entered.

Assume now that in the given example the logical access rights rule defined by the XPath like expression of Table XII below is generated for the user "Bob" on the basis of the rule (A4) and stored in the "bob.damv" file.

TABLE XII

XPATH LIKE EXPRESSION EXAMPLE

001 *[@TABLE_NAME='Demographic' AND @COLUMN_NAME='ssn']
GRANT

As can be seen from Table XII, the XPath like expression of line 001 defines that any logical field in the exemplary DAM of Table III that references the "ssn" column in the "Demographic" table should be accessible to the user "Bob" such that "Bob" may access the physical data in the "ssn" column. In other words, an effective DAM which is created from the exemplary DAM of Table III for the named user "Bob" should display the logical field "SSN" (line 008 of Table III) and allow use thereof regardless of any other logical access rights rule defined at a lower authorization level.

Processing then returns to step 1240, where the loop consisting of steps 1240, 1242, 1250, 1252 and 1254 is entered for a next named user. In the given example, the loop is re-entered for the named user "Fred" and all physical access rights rules defined at the "named user" authorization level for the user "Fred" are identified from the stored access rights at step 1242. Accordingly, at step 1242 the physical access rights rule (B4) is identified for this user.

At step 1250, the loop consisting of steps 1250, 1252 and 1254 is entered for the rule (B4) of the user "Fred". Then, at step 1252 a logical access rights rule is created for the rule (B4) as described above. At step 1254, the generated logical access rights rule is added to a view which is applicable to the named user "Fred". In the given example, assume that the generated logical access rights rule is added to a file "fred.damv" which defines the view for the named user "Fred". Processing then returns to step 1250, where the loop consisting of steps 1250, 1252 and 1254 is entered for a next identified physical access rights rule. As in the given example only one physical access rule is identified for the named user "Fred", the loop is not re-entered. Assume now that in the given example the logical access rights rule defined by the XPath like expression of Table XIII below is generated for the user "Fred" and stored in the "fred.damv" file.

TABLE XIII

XPATH LIKE EXPRESSION EXAMPLE

001 *[@TABLE_NAME='Diagnoses' AND @COLUMN_NAME='illness']
REMOVE

As can be seen from Table XIII, the XPath like expression of line 001 defines that access to any logical field in the exemplary DAM of Table III that references the "illness" column in the "Diagnoses" table is not allowed for the user "Fred". In other words, an effective DAM which is created from the exemplary DAM of Table III for the named user "Fred" should not display the logical field "Disease" (line 010 of Table III) regardless of any other logical access rights rule defined at a lower authorization level.

Processing then returns to step 1240, where the loop consisting of steps 1240, 1242, 1250, 1252 and 1254 is entered for a next named user. As in the given example all named users have been processed, processing continues at step 1260.

At step 1260, a logical authorization file is created. As was noted above, the logical authorization file includes mappings from user entities to generated views that are to be applied to a corresponding DAM (i.e., the exemplary DAM of Table III) upon user logon. In the given example, mappings for the "all users" entity, the social service group, the research group, and the named users Bob and Fred are created in the logical authorization file. Exemplary mappings which are illustrated in natural language for purposes of simplicity are shown in Table XIV below. However, it should be noted that implementation of the exemplary mappings is not limited to a particular machine-readable language and that an implementation in any machine-readable language, known or unknown, is broadly contemplated.

TABLE XIV

MAPPINGS EXAMPLE

| 001 | all users = all_user.damv |
| 002 | social service group = view1.damv |
| 003 | research group = view2.damv |
| 004 | Bob = bob.damv |
| 005 | Fred = fred.damv |

As can be seen from Table XIV, the created view files are mapped to entities of a corresponding authorization level, for which they have been created. For instance, line 004 indicates that the "bob.damv" file defines logical access rights rules for the named user "Bob".

It should be noted that in the illustrated embodiment only mappings for users which have an associated user-specific view file are included with the exemplary mappings of Table XIV. For instance, for the user "Bob" the mapping in line 004 of Table XIV has been generated. However, assume now that a user "Steven" is member of the research group and a user "Henry" is user of a management group. Assume further that both users are users of the exemplary DAM of Table III above, but that no user-specific view is provided for these users. Accordingly, no mapping which is explicitly related to the users "Steven" or "Henry" is included with the logical authorization file. In another embodiment, a mapping can be created in the logical authorization file for each user of the exemplary DAM of Table III. In this case, the mapping for a given user may include indications of all applicable views for that given user. For instance, for the user "Henry" the mapping "Henry=all_user.damv" can be included with the logical authorization file, as Henry is member of the "all users" entity. In this case, for the user "Bob" the mapping "Bob=all_users.damv, view2.damv, bob.damv" can be included with the logical authorization file, as Bob is member of the "all users" entity and the research group, and furthermore the user-specific view bob.damv is expressly defined for the user Bob.

The created logical authorization file and the generated view files, i.e., the view files which are specified in the logical authorization file, define a logical security model (e.g., logical security model 152 of FIG. 9). In other words, in the given example the view files (i) all_users.damv according to Tables VIII and IX, (ii) view1.damv according to Table X, (iii) view2.damv according to Table XI, (iv) bob.damv according to Table XII and fred.damv according to Table XIII, and the logical authorization file according to Table XIV define the logical security model. Using the logical security model, access rights to the exemplary DAM of Table III can be determined upon user logon, as described in more detail below with reference to FIG. 13.

Figure 13:
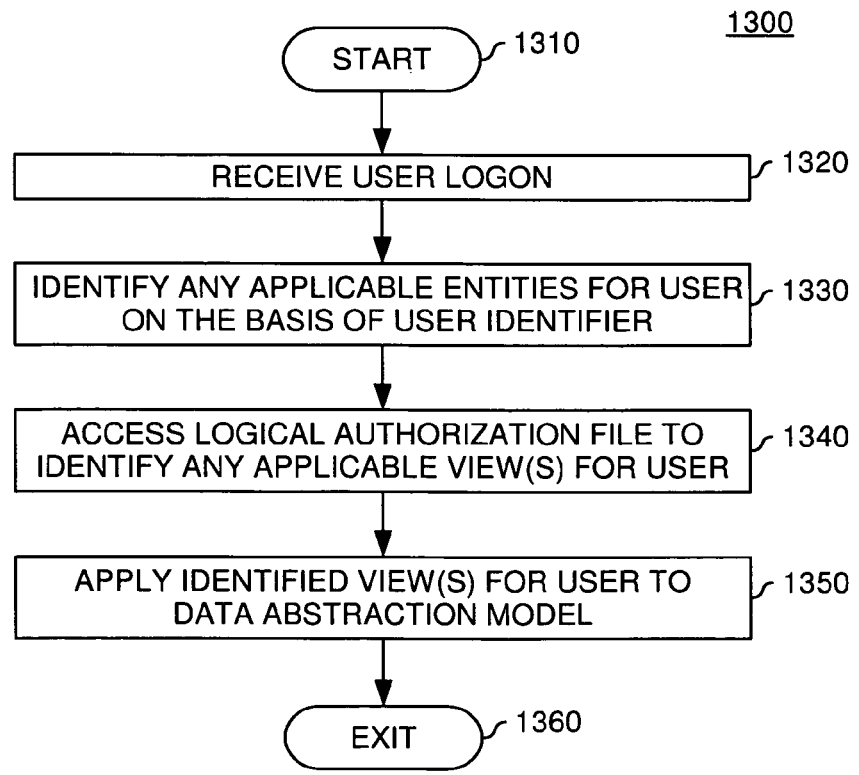
FIG. 13 is a flow chart illustrating identification of applicable views based on user authorizations in one embodiment.

Referring now to FIG. 13, an exemplary method 1300 for managing access to a data abstraction model (e.g., data abstraction model 132 of FIG. 10) using a logical security model is illustrated. In one embodiment, at least a portion of the steps of method 1300 is performed using a suitable DAM security management component (e.g., DAM security management component 150 of FIG. 1). Method 1300 starts at step 1310.

At step 1320, a user logon is received from a given user. At step 1330, any applicable user entities for the given user are identified on the basis of a unique identifier associated with the given user (hereinafter referred to as "user ID"). In the given example, assume that a logon is received from the user "Bob" who is a member of the research group. Accordingly, the "all users" entity and the research group are identified at step 1330 for the user Bob. Similarly, if the user "Fred" logs on, the "all users" entity and the social service group are identified for the user Fred. For the user "Steven" the "all users" entity and the research group are identified, and for the user "Henry" only the "all users" entity is identified.

At step 1340, the logical security model associated with the data abstraction model is accessed. More specifically, the logical authorization file of the logical security model is accessed to identify all relevant mappings and, accordingly, all applicable view(s) therefrom. In the given example, the logical authorization file of Table XIV is accessed and the mappings illustrated in Table XV below are identified for the users Bob, Fred, Steven and Henry.

TABLE XV

USER MAPPINGS EXAMPLE

| | |
|---|---|
| 001 | Bob = all_users.damv, view2.damv, bob.damv |
| 002 | Fred = all_users.damv, view1.damv, fred.damv |
| 003 | Steven = all_users.damv, view2.damv |
| 004 | Henry = all_users.damv |

As can be seen from line 001 of Table XV, the user "Bob" is associated with: (i) the all_users.damv, as Bob is member of the "all users" entity, (ii) the view2.damv which is defined for all users of the research group, and (iii) the user-specific bob.damv which is expressly defined for the user Bob. Similarly, according to line 002 the user "Fred" is associated with: (i) the all_users.damv, as Fred is also member of the "all users" entity, (ii) the view1.damv which is defined for all users of the social service group, and (iii) the user-specific fred.damv which is expressly defined for the user Fred. According to line 003, the user "Steven" is associated with: (i) the all_users.damv, as Steven is also member of the "all users" entity, and (ii) the view2.damv which is defined for all users of the research group. The user "Henry" is only associated with the all_users.damv, as Henry is only member of the "all users" entity.

At step 1350, for each of the users, all applicable view(s) are applied to the data abstraction model as described above to present an effective DAM to the user. In one embodiment, if more than one applicable view is identified for a given user, the collective applicable views, i.e., the underlying view files, are merged into a single personalized view for the given user. According to one aspect, the merge is always performed when the given user logs on in order to guarantee that modifications to one or more of the underlying view files are reflected in the single personalized view file. More specifically, the logical access rights rules of the more than one applicable views are merged, whereby logical access rights rules of views of higher authorization levels are given precedence. For instance, for the user "Bob" the all_users.damv, the view2.damv and the bob.damv are merged to create a single personalized view for the user "Bob". As logical access rights rules of higher authorization levels are given precedence over logical access rights rules of lower authorization levels, the logical access rights rules of the bob.damv are given precedence over the logical access rules of the view2.damv. The logical access rules of the view2.damv in turn are given precedence over the logical access rules of the all_users.damv. More specifically, according to the all_users.damv file according to Tables VIII and IX and the view2.damv file of Table XI, any logical field in the exemplary DAM of Table III that references the "ssn" column in the "Demographic" table should be removed in order to prevent access to the data in that column by users of the "all users" entity and the research group. However, according to the bob.damv file of Table XII, access to the physical data in the "ssn" column should be granted to the user Bob who is member of the "all users" entity and the research group. As the bob.damv is at the highest authorization level, i.e., the "named user" level, the logical access rights rules of the bob.damv file are given precedence over corresponding rules in the all_user.damv and research.damv files. Accordingly, the logical access rights rule of the bob.damv file is included with the merged personalized view for the user Bob who is, thus, granted access to the physical data in the "ssn" column. Accordingly, after merging all specified view files for the user Bob, the logical access rights rules illustrated in Table XVI below are obtained:

TABLE XVI

XPATH LIKE EXPRESSIONS EXAMPLE FOR USER BOB

| | |
|---|---|
| 001 | *[@TABLE_NAME='Demographic' AND @COLUMN_NAME='name'] GRANT |
| 002 | *[@TABLE_NAME='Demographic' AND @COLUMN_NAME='gender'] GRANT |
| 003 | *[@TABLE_NAME='Demographic' AND @COLUMN_NAME='ssn'] GRANT |
| 004 | *[@TABLE_NAME='Diagnoses' AND @COLUMN_NAME='illness'] GRANT |

As can be seen from Table XVI, all logical fields of the exemplary DAM of Table III should be available, i.e., accessible, to the user Bob.

The effective data abstraction models are then presented to the corresponding users. Method 1300 then exits at step 1360.

In various embodiments, the invention provides numerous advantages over the prior art. Further, as was noted above the present invention is not limited to a particular data abstraction model, including data abstraction models according to the framework of the '075 application, and various different logical models of physical data which abstractly describe the physical data are broadly contemplated. For instance, in one embodiment a "canned" physical query can be displayed to a user as a logical object which accesses underlying physical data. However, this logical object does not use logical fields defined by a data abstraction model. Rather, a canned physical query is a query created by an administrator using SQL statements that can be extended. Such a canned physical query is presented to users as a named logical object rather than as a SQL query. If, however, a particular user is not allowed to access the underlying physical data accessed by the canned physical query corresponding to a given named logical object, one or more logical access rights rules can be created according to embodiments of the invention to revoke access of the particular user to the named logical object. Accordingly, creation of logical access rights rules for various different logical models is broadly contemplated regardless of a particular implementation of the logical models.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer-implemented method for creating a logical security model based on a physical security model defining user access rights to physical data, the method comprising:
   for each of the user access rights defined by the physical security model, creating a logical access right definition for a logical model, wherein the logical model comprises a plurality of logical field definitions each comprising a field name, physical field location information identifying a specific field of the physical data and an access method for accessing the specific field of the physical data according to the physical field location information; wherein the access methods of a first portion of the plurality of logical field definitions are of a first type and the access methods of a second portion of the plurality of logical field definitions are of a second type;
   applying the logical access right definitions to the logical model so that the logical model reflects the user access rights to the physical data; and
   executing, by operation of one or more computer processors, abstract queries composed on the basis of the logical model.

2. The method of claim 1, further comprising:
   allowing one or more users to access the physical data through the logical model, wherein the access to physical data is restricted according to the logical access right definitions.

3. The method of claim 1, wherein the physical field location information comprises an identifier of a database table and an identifier of a column of the table.

4. A computer-implemented method for creating a logical security model based on a physical security model, the method comprising:
   automatically, by operation of one or more computer processors executing a data crawler, traversing physical data to identify physical access rights rules;
   creating a plurality of views defining logical access rights rules for the identified physical access rights rules of the physical data; and
   selectively applying the plurality of views to a logical model comprising a plurality of logical field definitions mapping to corresponding physical fields of the physical data, wherein the plurality of logical field definitions each comprise a field name, physical field location information identifying a specific field of the physical data and an access method for accessing the specific field of the physical data according to the physical field location information; wherein the access methods of a first portion of the plurality of logical field definitions are of a first type and the access methods of a second portion of the plurality of logical field definitions are of a second type; wherein the application of the plurality of views to the logical model operates to make selected logical fields unavailable to a user of the logical model, the selected logical fields being those for which logical access rights rules exist, whereby access to the physical data is restricted on the basis of the applied plurality of views.

5. The method of claim 4, wherein the plurality of views comprise expressions each defining a physical location of a field of the physical data for which an identified access rights rule exists.

6. The method of claim 4, wherein automatically traversing physical data to identify the physical access rights rules comprises:
   accessing a physical database containing the physical data;
   identifying all database tables contained in the physical database, the database tables containing the physical data; and
   for each database table, retrieving an associated table access rights specification including the physical access rights rules for the database table.

7. The method of claim 6, wherein automatically traversing physical data to identify the physical access rights rules comprises:
   iteratively identifying the physical access rights rules for all database tables of the physical database.

8. The method of claim 4, further comprising creating user profiles each defining one or more of the plurality of views to be applied to a given user, and wherein selectively applying the plurality of views comprises applying only those one or more of the plurality of views of a given user profile to the user for which the user profile is defined.

9. The method of claim 4, further comprising defining a given view of the plurality of views to be applied to a given group of users, and wherein selectively applying the plurality of views comprises applying the given view to users of the given group.

10. The method of claim 4, wherein the physical field location information comprises an identifier of a database table and an identifier of a column of the table.

11. The method of claim 4, wherein at least one of the plurality of logical field definitions comprises a field name that is different from a name of the field of the physical data to which the at least one of the plurality of logical field definitions maps to.

12. A computer-implemented method for creating a logical security model based on a physical security model defining user access rights to physical data, the method comprising:
   for each of the user access rights defined by the physical security model, creating a logical access right definition for a logical model, wherein the logical model abstractly describes the physical data and is defined for accessing the physical data; wherein the logical model comprises a plurality of logical field definitions that each comprise a field name, physical field location information identifying a specific field of the physical data and an access method for accessing the specific field of the physical data according to the physical field location information, a respective access method being invoked upon execution of a given abstract query containing a field name corresponding to a logical field definition containing the respective access method; and
   applying, by operation of one or more computer processors, the logical access right definitions to the logical model so that the logical model reflects the user access rights to the physical data, wherein applying the logical access right definitions to the logical model results in each of the access rights to the physical data being reflected in the logical model.

13. A computer-readable storage medium containing a program which, when executed by a processor, performs operations for creating a logical security model based on a physical security model defining user access rights to physical data, the operations comprising:

for each of the user access rights defined by the physical security model, creating a logical access right definition for a logical model, wherein the logical model comprises a plurality of logical field definitions each comprising a field name, physical field location information identifying a specific field of the physical data and an access method for accessing the specific field of the physical data; wherein the access methods of a first portion of the plurality of logical field definitions are of a first type and the access methods of a second portion of the plurality of logical field definitions are of a second type;

applying the logical access right definitions to the logical model so that the logical model reflects the user access rights to the physical data; and executing, by operation of one or more computer processors, abstract queries composed on the basis of the logical model.

14. The computer-readable storage medium of claim 13, wherein the operations further comprise:

allowing one or more users to access the physical data through the logical model, wherein the access to physical data is restricted according to the logical access right definitions.

15. The computer-readable storage medium of claim 13, wherein applying the logical access right definitions to the logical model results in each of the access rights to the physical data being reflected in the logical model.

16. The computer-readable storage medium of claim 13, wherein the physical field location information comprises an identifier of a database table and an identifier of a column of the table.

17. A computer-readable storage medium containing a program which, when executed by a processor, performs operations for creating a logical security model based on a physical security model, the operations comprising:

traversing, by operation of one or more computer processors executing a data crawler, physical data to identify physical access rights rules;

creating a plurality of views defining logical access rights rules for the identified physical access rights rules of the physical data; and selectively applying the plurality of views to a logical model comprising a plurality of logical field definitions mapping to corresponding physical fields of the physical data, wherein the plurality of logical field definitions each comprise a field name, physical field location information identifying a specific field of the physical data and an access method for accessing the specific field of the physical data according to the physical field location information; wherein the access methods of a first portion of the plurality of logical field definitions are of a first type and the access methods of a second portion of the plurality of logical field definitions are of a second type; wherein the application of the plurality of views to the logical model operates to make selected logical fields unavailable to a user of the logical model, the selected logical fields being those for which logical access rights rules exist, whereby access to the physical data is restricted on the basis of the applied plurality of views.

18. The computer-readable storage medium of claim 17, wherein the plurality of views comprise expressions each defining a physical location of a field of the physical data for which an identified access rights rule exists.

19. The computer-readable storage medium of claim 17, wherein traversing physical data to identify the physical access rights rules comprises:

accessing a physical database containing the physical data;

identifying all database tables contained in the physical database, the database tables containing the physical data; and for each database table, retrieving an associated table access rights specification including the physical access rights rules for the database table.

20. The computer-readable storage medium of claim 19, wherein traversing physical data to identify the physical access rights rules comprises:

iteratively identifying the physical access rights rules for all database tables of the physical database.

21. The computer-readable storage medium of claim 17, wherein the operations further comprise:

creating user profiles each defining one or more of the plurality of views to be applied to a given user, and wherein selectively applying the plurality of views comprises applying only those one or more of the plurality of views of a given user profile to the user for which the user profile is defined.

22. The computer-readable storage medium of claim 17, wherein the operations further comprise:

defining a given view of the plurality of views to be applied to a given group of users, and wherein selectively applying the plurality of views comprises applying the given view to users of the given group.

23. The computer-readable storage medium of claim 17, wherein the physical field location information comprises an identifier of a database table and an identifier of a column of the table.

24. The computer-readable storage medium of claim 17, wherein at least one of the plurality of logical field definitions comprises a field name that is different from a name of the field of the physical data to which the at least one of the plurality of logical field definitions maps to.

25. A system, comprising:

one or more computer processors;

a physical security model defining user access rights to physical data and stored on a storage medium; and a logical model security manager for creating a logical security model based on the physical security model, the logical model security manager being configured to:

for each of the user access rights defined by the physical security model, create a logical access right definition for a logical model, wherein the logical model comprises a plurality of logical field definitions each comprising a field name, physical field location information identifying a specific field of the physical data and an access method for accessing the specific field of the physical data according to the physical field location information; wherein the access methods of a first portion of the plurality of logical field definitions are of a first type and the access methods of a second portion of the plurality of logical field definitions are of a second type; and apply the logical access right definitions to the logical model so that the logical model reflects the user access rights to the physical data.

26. A system, comprising:

one or more computer processors;

a physical security model defining physical access rights rules and stored on a storage medium;

a logical model security manager for creating a logical security model based on the physical security model, the logical model security manager configuring at least one of the one or more computer processors to:

traverse physical data to identify the physical access rights rules;

create a plurality of views defining logical access rights rules for the identified physical access rights rules of the physical data; and selectively apply the plurality of views to a logical model comprising a plurality of logical field definitions mapping to corresponding physical fields of the physical data, wherein the plurality of logical field definitions each comprise a field name, physical field location information identifying a specific field of the physical data and an access method for accessing the specific field of the physical data according to the physical field location information; wherein the access methods of a first portion of the plurality of logical field definitions are of a first type and the access methods of a second portion of the plurality of logical field definitions are of a second type; wherein the application of the plurality of views to the logical model operates to make selected logical fields unavailable to a user of the logical model, the selected logical fields being those for which logical access rights rules exist, whereby access to the physical data is restricted on the basis of the applied plurality of views.

* * * * *